(12) United States Patent
Ishihara et al.

(10) Patent No.: US 9,234,106 B2
(45) Date of Patent: Jan. 12, 2016

(54) DISPERSION LIQUID OF CORE-SHELL TYPE COMPOSITE OXIDE FINE PARTICLES, PROCESS FOR PRODUCING THE DISPERSION LIQUID, AND COATING COMPOSITION CONTAINING THE FINE PARTICLES

(75) Inventors: Yoichi Ishihara, Kitakyushu (JP); Toshiharu Hirai, Kitakyushu (JP); Michio Komatsu, Kawasaki (JP)

(73) Assignee: JGC Catalysts and Chemicals Ltd., Kawasaki-shi (JP)

( * ) Notice: Subject to any disclaimer, the term of this patent is extended or adjusted under 35 U.S.C. 154(b) by 805 days.

(21) Appl. No.: 13/389,178

(22) PCT Filed: Jul. 26, 2010

(86) PCT No.: PCT/JP2010/062490
§ 371 (c)(1),
(2), (4) Date: Feb. 6, 2012

(87) PCT Pub. No.: WO2011/016353
PCT Pub. Date: Feb. 10, 2011

(65) Prior Publication Data
US 2012/0132108 A1    May 31, 2012

(30) Foreign Application Priority Data

Aug. 7, 2009 (JP) ................. 2009-185285

(51) Int. Cl.
| | | |
|---|---|---|
| C09D 1/00 | (2006.01) | |
| C09D 7/12 | (2006.01) | |
| B82Y 30/00 | (2011.01) | |
| C01B 13/36 | (2006.01) | |
| C09C 3/06 | (2006.01) | |
| C09C 1/36 | (2006.01) | |
| C09C 3/00 | (2006.01) | |
| C09C 3/04 | (2006.01) | |
| C09C 3/12 | (2006.01) | |
| C08K 3/22 | (2006.01) | |
| C08K 9/02 | (2006.01) | |

(52) U.S. Cl.
CPC ............... *C09D 7/1225* (2013.01); *B82Y 30/00* (2013.01); *C01B 13/363* (2013.01); *C09C 1/3623* (2013.01); *C09C 1/3661* (2013.01); *C09C 1/3692* (2013.01); *C09C 3/006* (2013.01); *C09C 3/041* (2013.01); *C09C 3/063* (2013.01); *C09C 3/12* (2013.01); *C09D 7/1266* (2013.01); *C09D 7/1291* (2013.01); *C01P 2004/61* (2013.01); *C01P 2004/64* (2013.01); *C01P 2004/84* (2013.01); *C01P 2004/88* (2013.01); *C01P 2006/22* (2013.01); *C08K 3/22* (2013.01); *C08K 9/02* (2013.01)

(58) Field of Classification Search
None
See application file for complete search history.

(56) References Cited

U.S. PATENT DOCUMENTS

| | | | | | |
|---|---|---|---|---|---|
| 3,804,655 | A | * | 4/1974 | Hinley | ............ B01J 2/006 106/437 |
| 4,294,885 | A | * | 10/1981 | Sunden | ............ C09C 1/42 427/214 |
| 5,468,289 | A | * | 11/1995 | Herget | ............ C09C 1/0015 106/31.88 |
| 2006/0165964 | A1 | | 7/2006 | Kato | |
| 2008/0268253 | A1 | | 10/2008 | Murai et al. | |
| 2009/0061183 | A1 | | 3/2009 | Muraguchi et al. | |
| 2009/0306277 | A1 | | 12/2009 | Goenner et al. | |

FOREIGN PATENT DOCUMENTS

| | | |
|---|---|---|
| EP | 1785458 A1 | 5/2007 |
| JP | 2000204301 A | 7/2000 |
| JP | 2004016920 A | 1/2004 |
| JP | 2004271612 A | 9/2004 |
| JP | 2005132724 A | 5/2005 |
| JP | 2007246351 A | 9/2007 |
| JP | 2009051680 A | 3/2009 |
| JP | 2009107872 A | 5/2009 |
| WO | 2008027979 A2 | 3/2008 |

OTHER PUBLICATIONS

Tanaka, Feb. 2005, JP 2005-132724 Machine Translation from PAJ Website.*

* cited by examiner

*Primary Examiner* — Patricia L Hailey
*Assistant Examiner* — Colin W Slifka
(74) *Attorney, Agent, or Firm* — The Webb Law Firm

(57) ABSTRACT

Core-shell type composite oxide fine particles are described in which the core particles are oxide fine particles or composite oxide fine particles that do not contain silicon and/or aluminum as main components, and the surface of the core particles is covered with a shell including a composite oxide that contains silicon and aluminum as main components, the shell containing silicon and aluminum in a weight ratio in terms of oxides, $SiO_2/Al_2O_3$, in the range of 2.0 to 30.0. A dispersion liquid of the core-shell type composite oxide fine particles exhibits very high stability.

27 Claims, No Drawings

DISPERSION LIQUID OF CORE-SHELL TYPE COMPOSITE OXIDE FINE PARTICLES, PROCESS FOR PRODUCING THE DISPERSION LIQUID, AND COATING COMPOSITION CONTAINING THE FINE PARTICLES

TECHNICAL FIELD

The present invention relates to a dispersion liquid of core-shell type composite oxide fine particles, a process for producing the dispersion liquid, a coating composition containing the core-shell type composite oxide fine particles, a curable coating film, and a substrate having the curable coating film.

BACKGROUND ART

Oxide fine particles and composite oxide fine particles of elements such as zirconium, titanium and tin have a higher refractive index than silica particles and are generally used as fillers for controlling the refractive index of transparent coating films such as hardcoat films.

However, adding such high-refractive index particles to a film-forming coating composition results in problems that they exhibit a low reactivity with a binder component and poor dispersion stability in the coating composition or a film.

Meanwhile, coating compositions that contain an organosilicon compound or a resin composition as a binder component are often required to be stored or used while being in an acidic region. However, a dispersion liquid containing such high-refractive index particles is unstable in an acidic pH region and the particles are easily aggregated.

Surface treatment with a silane coupling agent is known as a remedy to increase the dispersibility of particles. However, it is difficult to adequately treat the surface of such particles with a silane coupling agent, often failing to achieve sufficient dispersion stability. Thus, there has been a need for a more effective treatment method.

Patent Literature 1 discloses a method for improving the dispersibility of particles by covering the surface of zirconia fine particles with antimony pentoxide and/or silica.

Titanium oxide fine particles or composite oxide fine particles have another problem in that the weather resistance and the light resistance of coating films are lowered due to the activity of titanium. To remedy this problem, Patent Literature 2 discloses composite oxide fine particles in which nuclear particles of an oxide of titanium and tin are covered with silicon oxide and an oxide of zirconium and/or aluminum.

Patent Literature 3 discloses a titanium oxide sol in which titanium oxide sol particles are covered with a layer formed of a hydrated oxide of silicon and aluminum.

Further, Patent Literature 4 discloses inorganic oxide fine particles in which a silica-alumina hydrate has been deposited on the surface. The particles are described as an intermediate in the production of antibacterial inorganic oxide fine particles.

CITATION LIST

Patent Literature

Patent Literature 1: JP-A-2009-107872
Patent Literature 2: JP-A-2000-204301
Patent Literature 3: JP-A-2007-246351
Patent Literature 4: JP-A-2005-132724

The modified zirconia fine particles disclosed in Patent Literature 1 exhibit improved dispersibility and increased stability in an acidic condition as a result of the surface of zirconia fine particles being covered with antimony pentoxide and/or silica. However, there has still been a need for further improvements in these effects as well as in hardness and scratch resistance of films to which the particles have been added.

The composite oxide fine particles disclosed in Patent Literature 2 have a high refractive index and excellent weather resistance. However, there has been a need for improvements in the stability of the particles in a coating composition or a film as well as in hardcoat properties such as hardness and scratch resistance of films containing the particles.

The titanium oxide sol particles of Patent Literature 3 are covered with silicon oxide and aluminum oxide. The particles are still insufficient in terms of the stability in a dispersion liquid and the strength of films formed from the dispersion liquid.

In the production of the inorganic oxide fine particles of Patent Literature 4 in which a silica-alumina hydrate has been deposited on the surface, an alkaline sodium aluminate solution and an alkaline water glass solution are added to core particles in an alkaline suspension. Because this condition causes silica to exhibit high solubility, it is sometimes difficult that the silica-alumina layer be formed in a sufficient amount and with uniformity depending on the conditions. Such particles exhibit insufficient stability in a dispersion liquid.

Further, it is generally difficult to uniformly cover the surface of oxide particles such as zirconium or titanium oxide with, for example, silica.

SUMMARY OF THE INVENTION

The present inventors carried out studies in order to solve the problems in the art described above. They have then found that core-shell type composite oxide fine particles which have a high negative charge density in a specific range and a high rate of the coverage of the core with the shell can be obtained by covering the surface of core particles that do not contain silicon or aluminum as a main component with a shell that includes silicon and aluminum in a specific composition. The present invention has been completed based on the finding.

An aspect of the present invention is directed to core-shell type composite oxide fine particles comprising core-shell type composite oxide fine particles which comprises a core particle and shell and in which the surface of the core particle is covered with the shell, the core particle comprises is an oxide fine particle or a composite oxide fine particle that does not contain silicon and/or aluminum as main component, and the shell comprises a composite oxide containing silicon and aluminum as main components and the shell comprises the silicon and aluminum in a weight ratio in terms of oxides, $SiO_2/Al_2O_3$, in the range of 2.0 to 30.0.

The shell preferably includes a silicon aluminum composite oxide.

The core-shell type composite oxide fine particles preferably have a surface negative charge per unit surface area in the range of 0.5 to 1.5 $\mu eq/m^2$ as measured at pH 6.

The shell preferably contains silicon and aluminum in a weight ratio in terms of oxides, $SiO_2/Al_2O_3$, in the range of 2.0 to 15.0.

The amount of the shell covering the core particle is preferably in the range of 5 to 100 parts by weight with respect to 100 parts by weight of the core particle.

The core-shell type composite oxide fine particles preferably have an average particle diameter in the range of 8 to 60 nm.

The core particles are preferably oxide fine particles or composite oxide fine particles that contain one or more elements selected from zirconium, tin, titanium, niobium, tungsten, antimony and indium as main components.

The core particles are preferably oxide fine particles or composite oxide fine particles that contain one or more elements selected from titanium, tin, silicon, zirconium, antimony, barium, strontium, lithium, indium, lanthanum, potassium and sodium as auxiliary components.

In a dispersion liquid of the core-shell type composite oxide fine particles, the solid concentration is preferably in the range of 5 to 60% by weight.

The viscosity at a solid concentration of 30% by weight is preferably in the range of 0.8 to 20 mPa·s.

In the dispersion liquid of the core-shell type composite oxide fine particles, the dispersion medium is preferably water and/or one, or two or more selected from alcohols including methanol, ethanol, butanol, propanol and isopropyl alcohol, ethers including ethylene glycol monomethyl ether, propylene glycol monomethyl ether and propylene glycol monoethyl ether, and ketones including methyl ethyl ketone and γ-butyrolactone.

Preferably, the surface of the core-shell type composite oxide fine particles has been modified with an organosilicon compound or an amine.

In the dispersion liquid of the core-shell type composite oxide fine particles, the pH is preferably in the range of 3.0 to 7.0.

A coating composition according to the present invention includes the dispersion liquid of the core-shell type composite oxide fine particles and a binder component.

In the coating composition, the content of the core-shell type composite oxide fine particles is preferably in the range of 0.1 to 50% by weight in terms of solid concentration.

In the coating composition, the viscosity is preferably in the range of 1 to 100 mPa·s when the content of the core-shell type composite oxide fine particles is 30% by weight in terms of solid concentration.

The coating composition preferably further includes a UV absorber.

A curable coating film according to the present invention is obtained by applying the coating composition onto a substrate.

A substrate having a coating film according to the present invention is obtained by providing the curable coating film on a substrate.

A process for producing a dispersion liquid of core-shell type composite oxide fine particles according to the present invention includes:

(1) a step of mixing a silicon compound solution which contains a silicon alkoxide and/or silicic acid, and an aqueous aluminate solution to an aqueous dispersion liquid of core particles having an average particle diameter in the range of 5.0 to 50.0 nm, in a weight ratio in terms of oxides, $SiO_2/Al_2O_3$, in the range of 2.0 to 40.0 wherein $SiO_2$ indicates a silicon component contained in the silicon compound solution and $Al_2O_3$ indicates an aluminum component contained in the aqueous aluminate solution; and (2) a step of heating the mixture liquid obtained in the above step to a temperature of 60 to 200° C. and stirring the mixture liquid at the temperature for 0.5 to 20 hours.

Preferably, the process further includes the following step (3):

(3) a step of contacting the mixture liquid obtained in the step (2) with a cation exchange resin to remove by ion exchange alkali metal ions contained in the mixture liquid and thereby controlling the pH of the mixture liquid to be in the range of 3.0 to 7.0.

Preferably, the silicon compound solution and the aqueous aluminate solution are added to the aqueous dispersion liquid of core particles at the same time.

The silicon compound solution is preferably a silicic acid solution having a pH of not more than 3.

The core particles are preferably oxide fine particles or composite oxide fine particles that contain one or more elements selected from zirconium, tin, titanium, niobium, tungsten, antimony and indium as main components.

The core particles preferably have a specific surface area in the range of 50 to 250 $m^2/g$.

The core particles are preferably particles that are obtained by spray drying or by spray drying followed by calcination of an aqueous dispersion liquid containing the core particles.

Preferably, the process further includes surface treating the core-shell type composite oxide fine particles with an organosilicon compound or an amine.

Preferably, the process further includes subjecting the dispersion liquid to a concentration step and/or an organic solvent replacement step.

Advantageous Effects of Invention

The core-shell type composite oxide fine particles according to the invention have a high surface negative charge per unit surface area and a high rate of the coverage of the core with the shell. Thus, the dispersion liquid of the particles exhibits a low viscosity and very high stability. The dispersion liquid of the core-shell type composite oxide fine particles is stable and shows excellent transparency even at a high concentration.

The core-shell type composite oxide fine particles of the invention may be freely configured so as to have a wide range of refractive indexes ranging from high to intermediate refractive indexes. The particles are highly stable even in an acidic pH region and exhibit excellent dispersion stability when added to a coating composition or a curable coating film, as well as excellent stability and dispersibility when the dispersion liquid containing the particles is concentrated. Further, the activity of the particles has been suppressed. Thus, the curable coating film containing the particles achieves excellent hardness, scratch resistance, transparency and weather resistance.

DETAILED DESCRIPTION OF THE INVENTION

Dispersion liquids of core-shell type composite oxide fine particles according to the present invention will be described in detail hereinbelow.

Core Particles

Core particles in the invention are oxide fine particles or composite oxide fine particles that do not contain silicon and/or aluminum as main components.

Herein, the term "main components" means that the solid weight in terms of oxides ($SiO_2$ and $Al_2O_3$) represents not less than 70% by weight of the solid weight of the core particles.

The use of core particles which contain silicon and/or aluminum as main components is not preferable because the resulting core-shell type composite oxide fine particles will not show a high refractive index.

The core particles may be any particles as long as they do not contain silicon and/or aluminum as main components. In order to obtain core-shell type composite oxide fine particles having an intermediate to high refractive index, it is preferable that the core particles be oxide fine particles or composite oxide fine particles that contain one or more metal elements selected from, in particular, zirconium, tin, titanium, niobium, tungsten, antimony and indium as main components.

Herein, the term "main components" means that the solid weight of the components in terms of oxides ($ZrO_2$, $SnO_2$, $TiO_2$, $Nb_2O_5$, $WO_3$, $Sb_2O_5$, $In_2O_3$) represents more than 70% by weight of the core particles.

By using the core particles that are oxide fine particles or composite oxide fine particles containing one or more metal elements selected from zirconium, tin, titanium, niobium, tungsten, antimony and indium as main components, there may be obtained a dispersion liquid of core-shell type composite oxide fine particles exhibiting an intermediate to high refractive index.

Further, the core particles preferably contain one or more elements selected from titanium, tin, silicon, zirconium, antimony, barium, strontium, lithium, indium, lanthanum, potassium and sodium as auxiliary components.

Here, the metal elements which are the same as the metal elements contained in the core particles as the main components are not regarded as auxiliary components.

These auxiliary components control the refractive index or the UV absorption capability of the core particles, and suppress the activity of the core particles.

When the core particles contain the auxiliary components, the content of the auxiliary components in terms of oxides ($TiO_2$, $SnO_2$, $SiO_2$, $ZrO_2$, $Sb_2O_5$, $BaO$, $SrO$, $Li_2O$, $In_2O_3$, $La_2O$, $K_2O$, $Na_2O$) is preferably in the range of 0.1 to 30% by weight, and more preferably 1 to 20% by weight in terms of solid concentration. The auxiliary components that are added at less than 0.1% by weight will not produce effects appropriately. Any content in excess of 30% by weight is not preferable because it can result in a decrease of the refractive index of the core-shell type composite oxide fine particles, an increase in the optical activity, or a decrease in the stability of the core particles.

The average particle diameter of the core particles is preferably in the range of 5 to 50 nm, and more preferably 7 to 40 nm. Any average particle diameter that is less than 5 nm is not preferable because the core particles exhibit low stability in an aqueous dispersion liquid and an increase in viscosity may be encountered in the production of the dispersion liquid of the core-shell type composite oxide fine particles.

Any average particle diameter in excess of 50 nm is not preferable because it results in an increase in the average particle diameter of the core-shell type composite oxide fine particles manufactured using the core particles. As a result, the transparency of the curable coating films according to the invention may be lowered.

The specific surface area of the core particles is preferably in the range of 50 to 240 $m^2/g$, and more preferably 70 to 220 $m^2/g$. Any specific surface area that is less than 50 $m^2/g$ is not preferable because it causes the shell covering layer to be formed in a small thickness, and the desired film hardness may not be obtained. Any specific surface area in excess of 240 $m^2/g$ is not preferable because it may result in an increase in viscosity during the production of the dispersion liquid of the core-shell type composite oxide fine particles or an aggregation in the resulting dispersion liquid of the core-shell type composite oxide fine particles.

Shells

Shells in the invention are formed of a composite oxide that contains silicon and aluminum as main components. The shell contains silicon and aluminum in a weight ratio in terms of oxides, $SiO_2/Al_2O_3$, in the range of 2.0 to 30.0.

Herein, the term "main components" means that the total weight of silicon and aluminum in terms of respective oxides represents not less than 90% by weight of the shell.

Because of this specific composition, the shell can cover the core particles at an improved coverage rate so as to give core-shell type composite oxide fine particles that are uniformly covered and exhibit high stability and weather resistance. Further, the shells provide a specific high negative charge per unit surface area of the core-shell type composite oxide fine particles. Thus, the obtained dispersion liquid exhibits high stability and transparency, can be concentrated to a high concentration, and achieves marked improvements in terms of film hardness, scratch resistance and transparency when added to a film.

Here, the phrase "a composite oxide that contains silicon and aluminum as main components" does not mean a composite formed between silicon oxide and aluminum oxide but does refer to a composite oxide that uniformly contains a structure in which aluminum atoms are bonded with silicon atoms with oxygen therebetween.

Due to the shells having the above structure with uniformity, the core-shell type composite oxide fine particles achieve a high surface coverage rate, a high surface negative charge density and high stability.

Further, the core-shell type composite oxide fine particles, which have a high surface negative charge density and high stability, can be dispersed uniformly in a coating film. The particles have a large amount of OH groups on the surface which can easily cause shrinkage by undergoing polycondensation. This configuration enables an increase in hardness of films containing the particles.

The content of aluminum relative to silicon in the shell is preferably such that the weight ratio in terms of oxides, $SiO_2/Al_2O_3$, is in the range of 2.0 to 30.0, more preferably 2.5 to 25.0, and still more preferably 2.5 to 15.0.

Any weight ratio that is less than 2.0 is not preferable because the interaction between the core-shell type composite oxide fine particles becomes so strong that the dispersion liquid increases the viscosity and is sometimes gelled, resulting in deteriorations in storage stability. Any weight ratio in excess of 30.0 is not preferable because the surface negative charge of the core-shell type composite oxide fine particles is insufficient and the rate of the coverage of the core with the shell is lowered, with the result that poor stability is encountered when the dispersion liquid is concentrated. In particular, the dispersion liquid of such particles tends to increase the viscosity or be gelled in an acidic region, and the hardness of coating films obtained therefrom is lowered.

In order for the core-shell type composite oxide fine particles to achieve higher stability, the shell is preferably a silicon aluminum composite oxide. The presence of elements other than silicon and aluminum in the shell can result in a decrease in the surface negative charge of the core-shell type composite oxide fine particles or a decrease in the rate of the coverage of the core with the shell.

Core-Shell Type Composite Oxide Fine Particles

In the core-shell type composite oxide fine particles of the invention, the core particles are oxide fine particles or composite oxide fine particles that do not contain silicon and/or aluminum as main components, and the surface of the core particles is covered with the shell including a composite oxide that contains silicon and aluminum as main components. The shell contains silicon and aluminum in a weight ratio in terms of oxides, $SiO_2/Al_2O_3$, in the range of 2.0 to 30.0.

The core-shell type composite oxide fine particles preferably have a surface negative charge per unit surface area, as measured in an aqueous solution at pH 6, in the range of 0.5 to 1.5 μeq/m$^2$, and more preferably 0.6 to 1.4 μeq/m$^2$. Any surface negative charge that is less than 0.5 μeq/m$^2$ is not preferable because a sufficient repulsive force is not generated between the core-shell type composite oxide fine particles and thus concentrating the dispersion liquid can result in low stability, an increase in viscosity or gelation. Any surface negative charge in excess of 1.5 μeq/m$^2$ is not preferable because the interaction between the core-shell type composite oxide fine particles is so increased that the dispersion liquid can increase the viscosity or be gelled.

The amount of the shell covering the core particle is preferably in the range of 5 to 100 parts by weight, and more preferably 7 to 80 parts by weight in terms of solid with respect to 100 parts by weight of the core particle in terms of solid.

Any shell coverage amount that is less than 5 parts by weight is not preferable because the dispersion liquid of the core-shell type composite oxide fine particles is lowered in stability and a curable coating film obtained with such a dispersion liquid may exhibit low hardness. Any shell coverage amount in excess of 100 parts by weight is not preferable because the refractive index of the core-shell type composite oxide fine particles is so lowered that the particles are sometimes not suited for forming a curable coating film on an intermediate to high refractive index substrate.

The average particle diameter of the core-shell type composite oxide fine particles is preferably in the range of 8 to 60 nm, and more preferably 10 to 50 nm. Any average particle diameter that is less than 8 nm is not preferable because concentrating the dispersion liquid to a high concentration tends to result in an increase in viscosity and it is difficult to obtain the desired film hardness. Any average particle diameter in excess of 60 nm is not preferable because it can result in a decrease in the transparency of the obtainable curable coating film.

The specific surface area of the core-shell type composite oxide fine particles is preferably in the range of 60 to 400 m$^2$/g, and more preferably 80 to 380 m$^2$/g. Any specific surface area that is less than 60 m$^2$/g is not preferable because the reactivity with respect to a binder component contained in the coating composition becomes so low that the resulting curable coating film is lowered in hardness. Any specific surface area in excess of 400 m$^2$/g is not preferable because the reactivity with respect to the binder component is so increased that pores are easily formed in the resulting curable coating film and the hardness of the film is lowered.

In an embodiment of the core-shell type composite oxide fine particles, the surface of the shells has been treated with a known surface treating agent, for example an organosilicon compound such as a silane coupling agent or an amine.

When the core particles are titanium oxide fine particles or titanium composite oxide fine particles, the refractive index of the core-shell type composite oxide fine particles is preferably in the range of 1.7 to 2.7, and more preferably 1.85 to 2.5. Such core-shell type composite oxide fine particles are suitably used as high-refractive index particles.

When the core particles are zirconium or niobium oxide fine particles or zirconium- or niobium-based composite oxide fine particles, the refractive index of the core-shell type composite oxide fine particles is preferably in the range of 1.6 to 2.2, and more preferably 1.7 to 2.1. Such core-shell type composite oxide fine particles are suitably used as intermediate to high-refractive index particles.

When the core particles are tin or tungsten oxide fine particles or composite oxide fine particles based on tin, tungsten, antimony or indium, the refractive index of the core-shell type composite oxide fine particles is preferably in the range of 1.5 to 2.0, and more preferably 1.6 to 1.9. Such core-shell type composite oxide fine particles are suitably used as intermediate-refractive index particles.

The dispersion liquid of core-shell type composite oxide fine particles according to the invention is a dispersion liquid in which the aforementioned core-shell type composite oxide fine particles are dispersed in a solvent.

The solvent may be water, an organic solvent or a mixture of water and an organic solvent.

Examples of the organic solvents include alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

The solid concentration in the dispersion liquid of the core-shell type composite oxide fine particles is preferably in the range of 5 to 60% by weight, and more preferably 10 to 50% by weight. Any solid concentration that is less than 5% by weight is not preferable because the solid concentration in the coating liquid becomes so low that a large amount of the solvent has to be evaporated in order to form a coating film, causing economic disadvantages. Any solid concentration in excess of 60% by weight is not preferable because the dispersion liquid is sometimes increased in viscosity or lowered in storage stability.

The dispersion liquid of the core-shell type composite oxide fine particles preferably has a viscosity at a solid concentration of 30% by weight in the range of 0.8 to 20 mPa·s, and more preferably 1 to 10 mPa·s. Any viscosity that is less than 0.8 mPa·s is not preferable because adding such a dispersion liquid results in a coating composition with a low viscosity which can cause difficulties when the composition is applied onto a substrate depending on the application method. Any viscosity in excess of 20 mPa·s is not preferable because adding such a dispersion liquid results in a coating composition with a high viscosity which can cause difficulties when the composition is applied onto a substrate depending on the application method.

The dispersion liquid of the core-shell type composite oxide fine particles according to the invention has high dispersion stability, can be concentrated to a high concentration, and exhibits high transparency. The dispersion liquid can find use in various applications by being controlled in terms of the refractive index, the catalytic activity and the UV absorption capability of the core-shell type composite oxide fine particles.

In particular, the core-shell type composite oxide fine particles of the invention have a high negative surface charge due to the composite oxide containing silicon and aluminum which forms the surface of the particles. This configuration permits the dispersion liquid to be used stably in a wide range of pH values. In particular, the dispersion liquid is very stable in an acidic pH region from 3.0 to 7.0, in which a general dispersion liquid of intermediate to high-refractive index particles becomes instable. Thus, the dispersion liquid of the invention can be particularly suitably added to a coating composition or a resin composition which is to be used in an acidic region.

Further, the core-shell type composite oxide fine particles have a large amount of hydroxyl groups on the surface which exhibit high reactivity in the hydrolysis reaction with a binder component such as an organosilicon compound. Thus, stable and very hard coating films can be formed.

A coating composition according to the invention contains the dispersion liquid of the core-shell type composite oxide fine particles and thus can form a curable coating film that has excellent transparency and weather resistance as well as excellent high film hardness and scratch resistance. Therefore, the coating composition can be particularly suitably used in order to form a curable coating film such as a hardcoat layer or a primer layer on optical substrates such as plastic eyeglass lenses.

Hereinbelow, processes for producing the dispersion liquid of the core-shell type composite oxide fine particles will be described.

Process for Producing Core Particles

First, an aqueous dispersion liquid of the core particles is prepared.

The aqueous core particle dispersion liquid may be prepared by any of known liquid phase methods such as neutralization hydrolysis or hydrolysis of a metal salt or a metal alkoxide as a starting material, neutralization coprecipitation in which an alkali is added to an aqueous metal salt solution and the resultant metal hydroxide is deflocculated, or a hydrothermal synthesis method.

The aqueous core particle dispersion liquid may be a commercial aqueous dispersion liquid of oxide particles or metal oxide particles.

Alternatively, the aqueous dispersion liquid of oxide particles or composite oxide particles that is obtained by any of the above liquid phase methods may be dried, optionally thereafter calcined, and the resultant oxide particles or composite oxide particles may be crushed, dispersed again in water and optionally deionized or classified as required, thereby giving an aqueous core particle dispersion liquid.

Still alternatively, powder composed of oxide particles or composite oxide particles that is obtained by a gas phase method such as a gas phase oxidation method, a gas phase decomposition method or a physical vapor synthesis (PVS) method may be crushed and dispersed in water to give an aqueous core particle dispersion liquid.

When use as the core particles is directly made of an aqueous dispersion liquid of oxide particles or composite oxide particles that is obtained by the liquid phase method, the resulted coating composition and the resulted coating film are further improved in stability and transparency. When use as the aqueous core particle dispersion liquid is made of an aqueous dispersion liquid of the dried, optionally calcined and crushed powder from an aqueous dispersion liquid of oxide particles or composite oxide particles that is obtained by the liquid phase method, or is made of an aqueous dispersion liquid of the crushed powder of oxide particles or composite oxide particles that are obtained by the gas phase method, such core particles exhibit a higher refractive index and are reduced in activity. Accordingly, the obtainable coating film can be further improved in refractive index and weather resistance.

When use as the core particles is made of the particles resulting through drying and optional calcination of an aqueous dispersion liquid of oxide fine particles or composite oxide fine particles that is obtained by the liquid phase method, the particles to be crushed may be dried with a common hot air dryer. However, spray drying with a spray dryer or the like is a preferable drying method in order to obtain particles with the desired particle diameters efficiently.

When the dried particles are further calcined, they may be preferably fed to a calcination apparatus and calcined at a temperature of 300 to 800° C. for 30 to 240 minutes in an oxygen-containing atmosphere such as air or an atmosphere such as nitrogen. Through the calcination, the refractive index of the resulting core particles is markedly increased. In the case of highly active core particles, the calcination results in improvements in weather resistance and light resistance.

If the calcination temperature is below 300° C., the calcination is less effective in increasing the refractive index of the particles. Calcination performed at above 800° C. causes the particles (in particular, primary particles) to be rapidly sintered with each other, resulting in a decrease in the specific surface area on the particle surface. Thus, it is preferable to perform the calcination at a temperature that is appropriately selected from the above range. If the calcination time is less than 30 minutes, the composite oxide fine particles may not be fully and sufficiently calcined. A calcination time in excess of 240 minutes is not preferable because of economic reasons.

Because the core particle powder obtained as described above or the core particle powder obtained by the gas phase method is composed of large particles with an average particle diameter of 1 μm or more, the powder is fed to a crusher and is crushed into fine particles having a small particle diameter such that the particles can form a sol. By the crushing, the fine particles are dispersed.

The crusher may be a conventional crusher such as a sand mill, a roll mill, a bead mill, a jet mill, an ultrasonic dispersing apparatus, Ultimizer or Nanomizer (registered trademark). The crusher may be operated under appropriate conditions in accordance with the type of crusher and properties of the core particle powder. For example, crushing may be preferably performed using a sand mill (a desktop sand mill manufactured by KANSAI PAINT CO., LTD.) in a manner such that an aqueous solution in which 0.1 to 0.2 mm diameter spherical quartz beads and the titanium-containing particles are suspended (solid concentration: 5 to 40% by weight) is supplied to the mill equipped with a ceramic disc rotor or the like and the particles are crushed under usual conditions (for example, the rotational speed of the rotor: 600 to 2000 rpm, treatment time: 1 to 10 hours).

A dispersion stabilizer or a dispersion accelerator may be added during crushing.

The dispersion stabilizer may be usually a carboxylic acid, a carboxylate, a hydroxycarboxylic acid (which has a carboxyl group and an alcoholic hydroxyl group in the molecule), or a hydroxycarboxylate. Specific examples include monocarboxylic acids such as tartaric acid, formic acid, acetic acid, oxalic acid, acrylic acid (unsaturated carboxylic acid) and gluconic acid and salts thereof, and polycarboxylic acids such as malic acid, oxalic acid, malonic acid, succinic acid, glutaric acid, adipic acid, sebacic acid, maleic acid, fumaric acid and phthalic acid and salts thereof. Examples further include hydroxycarboxylic acids such as α-lactic acid, β-lactic acid, γ-hydroxyvaleric acid, glyceric acid, tartaric acid, citric acid, tropic acid and benzylic acid and salts thereof.

Examples of the dispersion accelerators include aqueous solutions of alkali metal hydroxides such as NaOH and KOH, and basic compounds such as ammonia and organic amines.

The crushing and dispersing treatment results in an aqueous dispersion liquid of the core particles which has high transparency. Desirably, the aqueous core particle dispersion liquid contains the core particles at 1 to 50% by weight, preferably 5 to 40% by weight, and has a haze of 1 to 20%, preferably 2 to 15%. As required, the core particle dispersion liquid may be treated with a known wet classifier such as a centrifuge so as to separate and remove coarse particles having a particle diameter of 100 nm or more.

The average particle diameter of the core particles is preferably in the range of 5.0 to 50 nm, and more preferably 7.0 to 40 nm. Any average particle diameter that is less than 5.0 nm is not preferable because the aqueous core particle dispersion liquid shows low stability and is easily increased in viscosity. Any average particle diameter in excess of 50 nm is not preferable because it results in an increase in the particle diameter of the core-shell type particles produced by forming the shell layer over the surface of the core particles, possibly causing deteriorated transparency of coating films.

The specific surface area of the core particles is preferably in the range of 50 to 240 $m^2/g$, and more preferably 70 to 220 $m^2/g$. Any specific surface area that is less than 50 $m^2/g$ causes the shell covering layer to be formed in a small thickness, and the desired film hardness may not be obtained. Any specific surface area in excess of 240 $m^2/g$ is not preferable because it results in an increase in viscosity during the production of the dispersion liquid of the core-shell type composite oxide fine particles or an aggregation in the resultant dispersion liquid of the core-shell type composite oxide fine particles.

The aqueous core particle dispersion liquid obtained as described above is used in the following steps in order to produce the dispersion liquid of the core-shell type composite oxide fine particles.

Processes for Producing Dispersion Liquid of Core-Shell Type Composite Oxide Fine Particles Step (1)

A silicon compound solution which contains a silicon alkoxide and/or silicic acid, and an aqueous aluminate solution are mixed to the aqueous dispersion liquid of the core particles having an average particle diameter in the range of 5.0 to 50.0 nm, in a weight ratio in terms of oxides, $SiO_2/Al_2O_3$, in the range of 2.0 to 40.0 wherein $SiO_2$ indicates a silicon component contained in the silicon compound solution and $Al_2O_3$ indicates an aluminum component contained in the aqueous aluminate solution.

In this step, aluminic acid and silicic acid are reacted together uniformly so as to form a precursor of a composite oxide containing silicon and aluminum on the surface of the core particles.

Preferably, the silicon compound solution and the aqueous aluminate solution are added to the aqueous core particle dispersion liquid at the same time and at a constant rate. If these solutions are mixed with each other beforehand and then added to the aqueous core particle dispersion liquid, or if the solutions are added separately one after the other, the rate of the coverage of the core particle with the shell is lowered and the negative charge on the surface of the core-shell type composite oxide fine particles is decreased, resulting in deteriorations in the stability and the transparency of the dispersion liquid as well as in the film hardness. Thus, adding these solutions in such a manner is not preferable.

The silicon compound solution and the aqueous aluminate solution are preferably mixed to the core particle dispersion liquid in a weight ratio in terms of oxides, $SiO_2/Al_2O_3$, in the range of 2.0 to 40.0, more preferably 3.0 to 20.0, and still more preferably 4.0 to 10.0 wherein $SiO_2$ indicates a silicon component contained in the silicon compound solution and $Al_2O_3$ indicates an aluminum component contained in the aqueous aluminate solution.

The silicon compound may be preferably a silicon alkoxide such as tetramethoxysilane, a condensate thereof, tetraethoxysilane or a condensate thereof, or silicic acid.

When the silicon compound is a silicon alkoxide, the compound may be dispersed in an organic solvent such as alcohol as required and the resultant dispersion may be used as the silicon compound solution.

In the case of silicic acid as the silicon compound, the silicon compound solution may be a silicic acid solution that is obtained by deionizing an alkali silicate solution such as water glass. In such a case, the silicic acid solution preferably has a pH of not more than 3. If the pH of the silicic acid solution exceeds 3, the silicic acid solution may exhibit low stability. In the present invention, it is particularly preferable that the silicon compound solution be the silicic acid solution.

The solid concentration in the silicon compound solution is preferably in the range of 0.1 to 10% by weight in terms of $SiO_2$.

If the concentration in terms of $SiO_2$ is less than 0.1% by weight, the reactivity between aluminic acid and silicic acid may be lowered. Any concentration in excess of 10% by weight can result in aggregation of silica or aluminum components. Thus, such concentrations are not preferable.

Any weight ratio that is less than 2.0 is not preferable because the interaction between the particles becomes so strong that the liquid can increase the viscosity and be gelled, causing deteriorations in storage stability. Any weight ratio in excess of 40.0 is not preferable because the concentrating stability is deteriorated and a concentrating operation tends to result in an increase in viscosity or gelation, as well as because the film hardness is lowered at times.

The aluminate is preferably sodium aluminate and/or potassium aluminate.

The solid concentration in the aqueous aluminate solution is preferably in the range of 0.5 to 30% by weight in terms of $Al_2O_3$.

Any concentration in terms of $Al_2O_3$ that is less than 0.5% by weight is not preferable because it is likely that the aluminate be hydrolyzed to form a hydroxide. Any concentration in excess of 30% by weight is not preferable because the aggregation of silica or aluminum components can take place due to a local increase in pH or salt concentration.

The aqueous aluminate solution preferably has a $M_2O/Al_2O_3$ molar ratio (wherein M is an alkali metal element) in the range of 1.0 to 1.5. Any molar ratio that is less than 1.0 is not preferable because it is likely that the aluminate be hydrolyzed to form a hydroxide. Any molar ratio in excess of 1.5 is not preferable because it can result in difficult formation of the silica/alumina composite oxide precursor.

Further, the aqueous core particle dispersion liquid may be heated at a temperature of below 100° C. while the silicon compound solution and the aqueous aluminate solution are added to the aqueous core particle dispersion liquid. Heating at above 100° C. is not preferable because it facilitates the hydrolysis of the aluminate into an aggregated hydroxide.

The silicon compound solution and the aqueous aluminate solution are preferably added to the aqueous core particle dispersion liquid at an addition rate of 0.005 to 30 g/hr with respect to 1 g of the solid composite oxide particles contained in the aqueous core particle dispersion liquid. This addition rate is in terms of the total of $SiO_2$ and $Al_2O_3$ wherein $SiO_2$ indicates the silicon components contained in the silicon compound solution and $Al_2O_3$ indicates the aluminum components contained in the aqueous aluminate solution.

The addition at a rate of less than 0.005 is not economical due to the mixing step taking a long time, and is thus not preferable. The addition at a rate in excess of 30 is not preferable because the rate of the coverage of the core particle with the shell is lowered and the uniformity and the denseness of the composite oxide containing silicon and aluminum are lowered, possibly resulting in deteriorations in the stability of the core-shell type composite oxide fine particles.

The solid concentration in the core particle dispersion liquid is preferably in the range of 1 to 40% by weight, and more preferably 10 to 30% by weight. Any solid concentration that is less than 1% by weight is not preferable because it results in low production efficiency and consequent economic disadvantages. Any solid concentration in excess of 40% by weight is not preferable because the dispersion liquid may be increased in viscosity or may be lowered in storage stability.

The pH of the core particle dispersion liquid is preferably in the range of 7 to 12, and more preferably 8 to 11. If the core particle dispersion liquid has a pH of less than 7, the aluminate ions contained in the aqueous aluminate solution are solely hydrolyzed into hydroxides, which are aggregated possibly to reduce the transparency and the stability of the dispersion liquid of the composite oxide fine particles. At a pH in excess of 12, silica shows excessively high solubility to make it difficult for the silica/alumina composite oxide to be formed uniformly on the surface of the core particles, possibly resulting in a decreased transparency or an increased viscosity of the dispersion liquid with time. Thus, such pH values are not preferable. The above range of pH values of the core particle dispersion liquid ensures that the core particles are stable and can be covered with the shell densely and uniformly. Thus, the core-shell type composite oxide fine particles are further improved in stability.

The amount of the shell covering the core particle is preferably in the range of 5 to 100 parts by weight, and more preferably 7 to 80 parts by weight in terms of solid content with respect to 100 parts by weight of the core particle in terms of solid content.

Any shell covering amount that is less than 5 parts by weight is not preferable because the concentrating stability becomes insufficient and the film hardness may be deteriorated at times. Any shell covering amount in excess of 100 parts by weight is not preferable because the refractive index is excessively lowered and the dispersion liquid may not be suitably used in order to form a curable coating film on an intermediate to high-refractive index substrate.

Step (2)

The mixture liquid obtained in the step (1) is heated to a temperature of 60 to 200° C. and stirred at the temperature for 0.5 to 20 hours.

Through this step, the precursor of a composite oxide containing silicon and aluminum that has been formed on the surface of the core particles undergoes dehydration and condensation polymerization and is thereby stabilized on the surface of the core particles. As a result, the surface of the core particles is covered with the shell composed of a composite oxide containing silicon and aluminum. Through this step, the core-shell type composite oxide fine particles are increased in surface negative charge density as well as in stability.

The heating temperature is preferably in the range of 60 to 200° C., and more preferably 80 to 180° C.

Heating at a temperature below 60° C. does not permit the dehydration and the condensation polymerization of the precursor of a composite oxide containing silicon and aluminum to proceed sufficiently, and the dispersion liquid of the core-shell type composite oxide fine particles is reduced in stability and capability of being concentrated to a high concentration. Heating at a temperature above 200° C. is not preferable because the solubility of silica is so increased that the denseness of the shell is lowered and consequently the core particle dispersion liquid may be reduced in stability and capability of being concentrated to a high concentration.

Heating may be performed using a known apparatus and a known method. Heating may be carried out at an atmospheric pressure or an increased pressure. When heating is performed at an increased pressure by the use of, for example, an autoclave, the stability of the silica-based fine particle dispersion sol is further enhanced.

The stirring time is preferably in the range of 0.5 to 20 hours. A stirring time that is less than 0.5 hours is not preferable because it does not permit the dehydration and the condensation polymerization to proceed sufficiently, possibly resulting in a decrease in the stability of the dispersion liquid of the core-shell type composite oxide particles. Stirring for more than 20 hours does not cause any technical problems, but is not preferable for economic reasons due to the prolonged production time.

The dispersion liquid of the core-shell type composite oxide fine particles according to the invention may be produced in the above-described manner.

Further, the dispersion liquid of the core-shell type composite oxide fine particles may be subjected to the ion exchange treatment described below in order to adjust the pH of the dispersion liquid of the core-shell type composite oxide fine particles in the range of 3.0 to 7.0.

Step (3)

The mixture liquid obtained in the step (2) is contacted with a cation exchange resin to remove by ion exchange alkali metal ions contained in the mixture liquid and thereby to control the pH of the mixture liquid to be in the range of 3.0 to 7.0.

The pH is preferably in the range of 3.0 to 7.0, and more preferably 3.5 to 6.3.

If the pH is less than 3.0, part of the aluminum and/or the silica that has modified the surface of the core particles is dissolved and is removed by ion exchange by the cation exchange resin, possibly resulting in a decrease in the stability of the dispersion liquid of the core-shell type composite oxide fine particles and a decrease in the hardness of the resulting curable coating film. If the pH is in excess of 7.0, the dispersion liquid of the core-shell type composite oxide fine particles is destabilized and may be gelled. Thus, such pH values are not preferable.

The mixture liquid may be contacted with the cation exchange resin by a batch method (a resin circulation system), a column method (a resin-packed system) or any other known method. In the case of a batch method, stirring is preferably performed as required. The cation exchange may be carried out for a time that is appropriately controlled. Typically, sufficient results can be obtained when the aqueous silica-based fine particle dispersion sol is contacted with the cation exchange resin for 1 to 20 hours while performing stirring.

In the step (3), the mixture liquid may be heated so that the contact with the cation exchange resin will take place at a temperature of 60 to 95° C. The cation exchange under this temperature condition achieves higher effects in removing the alkali metal ions by ion exchange.

Through these steps (1) to (3), the dispersion liquid of the core-shell type composite oxide fine particles which has an acidic pH value of 3.0 to 7.0 may be obtained.

Surface Treatment

The surface of the core-shell type composite oxide fine particles may be treated with a known surface treatment agent, for example an organosilicon compound such as a silane coupling agent or an amine.

Examples of the organosilicon compounds include monofunctional silanes such as trimethylethoxysilane, dimethylphenylethoxysilane and dimethylvinylethoxysilane, difunctional silanes such as dimethyldiethoxysilane and diphenyldiethoxysilane, trifunctional silanes such as methyltriethoxysilane and phenyltriethoxysilane, and tetrafunctional silanes such as tetraethoxysilane. Examples of the amines include alkylamines such as triethylamine, isopropylamine and diisopropylamine, aralkylamines such as benzylamine, alicyclic amines such as piperidine, alkanolamines such as monoethanolamine and triethanolamine, and quaternary ammonium salts and quaternary ammonium hydroxides such as tetramethylammonium salt and tetramethylammoniumhydroxide.

The surface treatment method may be any known method without limitation. When the organosilicon compound is used as the surface treatment agent, the organosilicon compound or a partial hydrolyzate thereof may be dissolved in an organic solvent such as methanol and may be added to the aqueous dispersion sol, and the mixture may be heated to about 40 to 60° C. and stirred at the temperature for about 1 to 20 hours, thereby hydrolyzing the organosilicon compound or the partial hydrolyzate thereof and performing the surface treatment.

At the stage in which the operations of the surface treatment are completed, it is preferable that all the hydrolyzable groups of the organosilicon compound have been reacted with the OH groups that are present on the surface of the covering layer of the core-shell type composite oxide fine particles. However, part of such hydrolyzable groups may remain unreacted.

Concentration and Solvent Replacement Steps

The dispersion liquid of the core-shell type composite oxide fine particles may be concentrated as required by a known method such as ultrafiltration, evaporator concentration or evaporation.

Further, the dispersion medium of the dispersion liquid of the core-shell type composite oxide fine particles may be replaced by an organic solvent as required by a known method such as ultrafiltration or an evaporator method.

Examples of the organic solvents include alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

The solvent replacement by the organic solvent may be performed before or after the concentration step. In an embodiment, the silica-based fine particle dispersion sol may be concentrated and the solvent may be replaced simultaneously by the use of, for example, an ultrafiltration method or an evaporator.

The solid concentration of the core-shell type composite oxide fine particles is preferably in the range of 5 to 60% by weight, and more preferably 10 to 50% by weight. Any solid concentration that is less than 5% by weight is not preferable because adding such a dispersion liquid to a coating composition results in so low a solid concentration that a large amount of the solvent has to be evaporated in order to form a coating film, causing economic disadvantages. Any solid concentration in excess of 60% by weight is not preferable because the dispersion liquid is sometimes increased in viscosity or lowered in storage stability.

Film-Forming Coating Compositions

Coating compositions according to the present invention will be described below.

The coating composition of the invention includes the inventive core-shell type composite oxide fine particles and a binder component.

The binder component may be appropriately selected from known binders as well as those currently under development in accordance with the purpose of use of the coating composition.

Examples of the binder components include organosilicon compounds and/or hydrolyzates thereof, thermosetting organic resins and thermoplastic organic resins.

Examples of the organosilicon compounds and/or the hydrolyzates thereof include organosilicon compounds represented by Formula (I) below and/or hydrolyzates thereof:

$$R^1_a R^2_b Si(OR^3)_{4-(a+b)} \quad (I)$$

(wherein $R^1$ is a $C_{1-6}$ alkyl group, a $C_8$ or lower organic group having a vinyl group, a $C_8$ or lower organic group having an epoxy group, a $C_8$ or lower organic group having a methacryloxy group, a $C_{1-5}$ organic group having a mercapto group, or a $C_{1-5}$ organic group having an amino group; $R^2$ is a $C_{1-3}$ alkyl, alkylene, cycloalkyl, halogenated alkyl or allyl group; $R^3$ is a $C_{1-3}$ alkyl, alkylene or cycloalkyl group; a is an integer of 0 or 1; and b is an integer of 0, 1 or 2).

Typical examples of the organosilicon compounds represented by Formula (I) include alkoxysilane compounds such as tetraethoxysilane, methyltrimethoxysilane, vinyltrimethoxysilane, γ-methacryloxypropyltrimethoxysilane, trimethylchlorosilane, α-glycidoxymethyltrimethoxysilane, α-glycidoxyethyltrimethoxysilane, β-glycidoxyethyltrimethoxysilane, γ-glycidoxypropyltrimethoxysilane, γ-glycidoxypropyltriethoxysilane, γ-glycidoxypropylmethyldimethoxysilane, γ-γ-glycidoxypropylmethyldiethoxysilane, β-(3,4-epoxycyclohexyl)-ethyltrimethoxysilane, β-(3,4-epoxycyclohexyl)-ethyltriethoxysilane, γ-aminopropyltrimethoxysilane, γ-aminopropyltriethoxysilane, N-β(aminoethyl)-γ-aminopropylmethyldimethoxysilane and N-β(aminoethyl)-γ-aminopropylmethyldiethoxysilane. The organosilicon compounds may be used singly, or two or more kinds may be used in combination.

In particular, the organosilicon compound and/or the hydrolyzate thereof is preferable as the binder when the coating composition is used to form a hardcoat film on, for example, an optical substrate.

In the preparation of the coating composition of the present invention using the organosilicon compound as the binder component, it is preferable that the organosilicon compound be partially or completely hydrolyzed in the presence of an acid or water without a solvent or in a polar organic solvent such as an alcohol, and thereafter the partial hydrolyzate or the hydrolyzate be mixed to the dispersion liquid of the core-shell type composite oxide fine particles. In an embodiment, the organosilicon compound and the dispersion liquid of the core-shell type composite oxide fine particles may be mixed together first and the mixture may be partially or completely hydrolyzed.

The dispersion liquid of the core-shell type composite oxide fine particles and the organosilicon compound and/or the hydrolyzate thereof are preferably mixed in a weight ratio (X/Y) of 30/70 to 90/10, and more preferably 35/65 to 80/20 wherein X indicates the weight of the organosilicon compound in terms of $SiO_2$ and Y indicates the weight of the core-shell type composite oxide fine particles contained in the dispersion liquid of the core-shell type composite oxide fine particles. If the weight ratio is less than 30/70, the adhesion with respect to a substrate or another coating film may be lowered. A weight ratio exceeding 90/10 may result in a decrease in the scratch resistance of the resultant coating film. Thus, such weight ratios are not preferable.

In the dispersion liquid of the core-shell type composite oxide fine particles according to the invention, the surface of the particles is covered with the complex oxide of silicon and aluminum, and the density of the hydroxyl groups on the surface is high. Thus, the particles exhibit very high reactivity with respect to the organosilicon compound and/or the hydrolyzate thereof. Accordingly, the coating composition containing such a binder component is particularly suited for use as a hardcoat layer-forming coating composition.

The thermosetting organic resin is preferably at least one selected from urethane resins, epoxy resins and melamine resins.

Specific examples of the urethane resins include reaction products between a block polyisocyanate such as hexamethylenediisocyanate and an active hydrogen-containing compound such as polyester polyol or polyether polyol. Specific examples of the epoxy resins include polyalkylene ether-modified epoxy resins and epoxy group-containing compounds in which a soft skeleton (a soft segment) has been introduced into the molecular chain.

Specific examples of the melamine resins include cured products formed between etherified methylol melamine and polyester polyol or polyether polyol. Of the resins, the urethane resins that are cured products formed between a block isocyanate and a polyol are preferably used. The thermosetting organic resins may be used singly, or two or more kinds may be used in combination.

The thermoplastic organic resin is preferably at least one selected from acrylic resins, urethane resins and ester resins, and is more preferably a self-emulsified aqueous emulsion resin.

Specific examples of the acrylic resins include aqueous emulsions obtained from an alkyl (meth)acrylate monomer, and polymer emulsions of copolymers of the above monomer and a comonomer such as styrene or acrylonitrile. Specific examples of the urethane resins include aqueous emulsions obtained by a reaction between a polyol compound such as polyester polyol, polyether polyol or polycarbonate polyol, and a polyisocyanate. Specific examples of the ester resins include water-dispersed elastomers that are multiblock copolymers in which the hard segment is a polyester and the soft segment is a polyether or a polyester. Of the resins, the water-dispersed urethane resins that are obtained from a polyester polyol or a polyether polyol, and a polyisocyanate are preferably used. The thermoplastic organic resins may be used singly, or two or more kinds may be used in combination.

When the thermosetting organic resin and the thermoplastic resin are used as the binder components, the coating composition may be prepared by mixing the resin(s) with the dispersion liquid of the core-shell type composite oxide fine particles. They are preferably mixed in a weight ratio (R/S) of 90/10 to 30/70, and more preferably 80/20 to 35/65 wherein R indicates the weight of the resin (s) and S indicates the weight of the core-shell type composite oxide fine particles in the dispersion liquid of the core-shell type composite oxide fine particles.

If the weight ratio is less than 30/70, the adhesion with respect to a substrate or another coating film, as well as the impact resistance of the coated substrate, may be lowered. A weight ratio exceeding 90/10 may result in a decrease in the refractive index or the heat resistance of the resultant coating film. Thus, such weight ratios are not preferable.

The coating composition is preferably an optical substrate coating composition, and is more preferably a hardcoat layer-forming coating composition.

Preferably, the coating composition further contains a UV absorber.

The UV absorber may be any known UV absorber or a UV absorber that is currently under development. Typical examples of the UV absorbers include optically stable organic compounds such as benzophenone compounds, cinnamic acid compounds, p-aminobenzoic acid compounds and salicylic acid compounds, and perovskite composite oxides such as calcium titanate, barium titanate and strontium titanate.

The addition of these UV absorbers to the coating composition is highly effective when the core particles used in the dispersion liquid of the core-shell type composite oxide fine particles are oxide particles or composite oxide particles of an element having no UV absorption capability, for example zirconium.

The coating composition according to the invention may further contain one or more additional components such as uncrosslinked epoxy compounds, surfactants, leveling agents, and/or light stabilizers and diluent solvents.

The binder components used in the coating composition may include metal alkoxides such as titanium alkoxides or compounds such as UV curable compounds (for example, polyfunctional acrylic compounds having an acryloyloxy group). Alternatively, compounds such as the UV curable compounds may be used instead of the thermosetting organic resins and the thermoplastic resins.

[Measurement Methods and Evaluation Test Methods]

The measurement methods and the evaluation test methods that were used in Inventive Examples and other Examples will be described in detail below.

With Respect to Dispersion Liquids (1) Methods for Measuring Average Particle Diameter The average particle diameter was measured by the following two methods.

(A) Particles Having Average Particle Diameter of Less than 200 nm

A particle dispersion liquid (solid content: 20% by weight) weighing 0.15 g was mixed together with 19.85 g of pure water to give a sample having a solid content of 0.15%. The sample was placed in a quartz cell 1 cm in length, 1 cm in width and 5 cm in height. The particle diameter distribution of the particles was measured with an ultrafine particle size analyzer (model: ELS-Z2, manufactured by Otsuka Electronics Co., Ltd.) by a dynamic light scattering method. The term "average particle diameter" in the present invention indicates a value that is calculated by the cumulant analysis of the measurement results.

(B) Particles having average particle diameter of not less than 200 nm (for example, dry powder)

Dried powder or calcined powder obtained from a particle dispersion liquid was dispersed into an aqueous glycerin-containing solution having a concentration of 40% by weight to give a slurry (solid concentration: 1.0% by weight). The slurry was ultrasonicated for 5 minutes with an ultrasonic generator (US-2 manufactured by Iuchi) so as to disperse the particles. The slurry was placed into a glass cell (10 mm in length, 10 mm in width and 45 cm in height) and was analyzed with a centrifugal sedimentation particle size distribution analyzer (CAPA-700 manufactured by HORIBA, Ltd.) at 300 to 10000 rpm for 2 minutes to 2 hours, thereby measuring the average particle diameter.

(2) Method for Measuring Specific Surface Area

Approximately 30 ml of powder obtained by drying a dispersion liquid of core particles or core-shell type composite oxide fine particles was placed into a magnetic crucible (B-2 model) and was dried at 300° C. for 2 hours. Thereafter, the powder was cooled to room temperature in a desiccator. Next, 1 g of this sample was analyzed using an automated surface area measuring apparatus (MULTISORB 12 manufactured by YUASA IONICS CO., LTD.) to determine the specific surface area ($m^2/g$) of the particles by a BET method.

(3) Method for Measuring Contents of Metal Elements in Core-Shell Type Composite Oxide Fine Particles A dispersion liquid of core particles or a dispersion liquid of core-shell type composite oxide fine particles (a sample) was collected in a zirconia bowl, dried and calcined. Thereafter, $Na_2O_2$ and NaOH were added, and the mixture was fused. Further, the product was dissolved with $H_2SO_4$ and HCl, and the solution was diluted with pure water. The diluted solution was analyzed with an ICP analyzer (ICPS-8100 manufactured by SHIMADZU CORPORATION) to determine the contents of titanium, tin, silicon and aluminum in terms of oxides ($TiO_2$, $SnO_2$, $SiO_2$ and $Al_2O_3$).

Next, another portion of the sample was collected onto a platinum dish, and HF and $H_2SO_4$ were added thereto, followed by heating. The product was dissolved with HCl. The solution was diluted with pure water. The diluted solution was analyzed with an ICP analyzer (ICPS-8100 manufactured by SHIMADZU CORPORATION) to determine the content of zirconium in terms of oxide ($ZrO_2$).

Next, a still another portion of the sample was collected onto a platinum dish, and HF and $H_2SO_4$ were added thereto, followed by heating. The product was dissolved with HCl. The solution was diluted with pure water. The diluted solution was analyzed with an atomic absorption analyzer (Z-5300 manufactured by Hitachi, Ltd.) to determine the contents of sodium and potassium in terms of oxides ($Na_2O$ and $K_2O$).

The contents of metal oxides referred to in the invention indicate values calculated from the results of the above measurements.

(4) Method for Measuring Amount of Surface Charge

A dispersion liquid of core-shell type composite oxide fine particles having a solid concentration of 30% by weight (the dispersion medium may be water or an organic solvent) was collected in an amount of 1.67 g and was mixed with 98.53 g of distilled water to give 100.00 g of a mixture solution having a solid concentration of 0.5% by weight. An aqueous hydrochloric acid solution or an aqueous ammonia solution was added to the mixture solution to give a sample aqueous solution that had a pH of 6.0 at 25° C. A 20.00 g portion of the sample solution was subjected to cation titration with streaming potential measurement with a streaming potential meter (PCD-T3 manufactured by MUETEK) using Poly-Dadmac as a standard cation titration liquid. The titration value determined with streaming potential measurement was obtained as the amount of the surface negative charge.

The value obtained by the above measurement indicated an amount (μeq/g) of surface negative charge per 1 g of the solid core-shell type composite oxide fine particles. The value was then divided by the specific surface area ($m^2/g$) of the core-shell type composite oxide fine particles to give an amount of negative charge per unit specific surface area of the core-shell type composite oxide fine particles.

(5) Method for Measuring pH 50 ml of a sample was added into a cell. The cell was placed into a thermostatic bath at 25° C., and a glass electrode of a pH meter (F22 manufactured by HORIBA, Ltd.) that had been calibrated using standard liquids of pH values of 4, 7 and 9 was inserted into the sample to measure the pH.

When water was the dispersion medium of the dispersion liquid of core-shell type composite oxide fine particles, the aforementioned aqueous dispersion liquid of 30% by weight solid concentration was used as the sample. When the dispersion medium was an organic solvent, the organic solvent dispersion liquid of core-shell type composite oxide fine particles which had a solid concentration of 30% by weight was diluted with distilled water ten times and the diluted dispersion liquid with a solid concentration of 3.0% by weight was used as the sample.

(6) Method for Measuring Viscosity

A dispersion liquid of core-shell type composite oxide fine particles having a solid concentration of 30% by weight (the dispersion medium may be water or an organic solvent) was collected in a volume of 20 ml. The viscosity thereof was measured with a viscometer (TV-10M manufactured by TOKI SANGYO CO., LTD.) at room temperature. The rotational speed of the rotor of the viscometer was 60 rpm when the viscosity of the sample was in the range of 1.0 to 10.0 mPa·s, 30 rpm in the range of 10.0 to 20.0 mPa·s, 12 rpm in the range of 20.0 to 50.0 mPa·s, and 6 rpm in the range of 50.0 to 100.0 mPa·s.

Further, the dispersion liquid of core-shell type composite oxide fine particles having a solid concentration of 30% by weight was subjected to an accelerated viscosity test in which the dispersion liquid was heated in a water bath at 40° C. for 7 days.

(7) Method for Measuring Haze

A dispersion liquid of core-shell type composite oxide fine particles having a solid concentration of 1.0% by weight (the dispersion medium may be water or an organic solvent) was placed into a quartz cell having a light path length of 33 mm. The turbidity (haze) was measured using a color difference/turbidity meter (COH-300A manufactured by NIPPON DENSHOKU INDUSTRIES CO., LTD.).

(8) Refractive Index of Particles

The refractive index of particles was determined by the following two methods.

(A) Calculation from Refractive Index of Coating Film 141.0 g of γ-glycidoxypropyltrimethoxysilane (Z-6040 manufactured by Dow Corning Toray Co., Ltd., 49.2% by weight in terms of $SiO_2$) and 71.0 g of methanol (manufactured by HAYASHI PURE CHEMICAL IND., LTD.) containing 99.9% by weight of methyl alcohol were mixed with each other. While performing stirring, 36.0 g of a 0.01 N aqueous hydrochloric acid solution was added dropwise to the mixture liquid. To the resultant mixture liquid that contained a hydrolyzate of the silane compound, there were added 26.0 g of an aqueous dispersion liquid of core-shell type composite oxide fine particles (solid concentration: 30.0% by weight), 3.0 g of tris(2,4-pentanedionate)aluminum III (manufactured by TOKYO CHEMICAL INDUSTRY CO., LTD.), and 0.7 g of a methanol solution which contained 10% by weight of a silicone surfactant (L-7006 manufactured by Dow Corning Toray Co., Ltd.) serving as a leveling agent. The resultant mixture was stirred at room temperature for a whole day and night to give a coating composition A (weight fraction of particles: 10% by weight). Herein, the term "weight fraction of particles" indicates the weight fraction of the core-shell type composite oxide fine particles relative to the total content of all the solids contained in the coating composition. The same applies hereinbelow.

A coating composition B (weight fraction of particles: 20% by weight), a coating composition C (weight fraction of particles: 30% by weight), a coating composition D (weight fraction of particles: 40% by weight), a coating composition E (weight fraction of particles: 50% by weight) and a coating composition F (weight fraction of particles: 55% by weight) were prepared in the same manner as described above except that the amount of the aqueous dispersion liquid was changed to 51.5 g, 77.2 g, 102.9 g, 128.7 g and 141.5 g.

The coating compositions A to F were each applied onto a silicon wafer substrate that had been maintained at a temperature of 40° C., using a spin coater (MS-A200 manufactured by MIKASA CO., LTD.) at 300 rpm. The wet film was dried at 120° C. for 2 hours to form a coating film. The coating films formed on the respective silicon wafer substrates were analyzed with a spectroscopic ellipsometer (SOPRA ESVG manufactured by SOPRA) to determine the refractive indexes Nav' (measured values) of the coating films.

In accordance with the volume fraction-weight fraction conversion equation (Math 1) and the Maxwell-Garnett equation (Math 2), theoretical refractive indexes Nav (calculated values) of the coating films were calculated with respect to each of the weight fractions of the particles.

Deviations between the coating film refractive indexes Nav calculated based on these equations and the coating film refractive indexes Nav' measured as described above were obtained. Squared deviations were calculated, and the sum of squared deviations was obtained by adding the calculated squared deviations. The sum of squared deviations was obtained with respect to each of the expected particle refractive indexes Np (for example, a plurality of expected particle refractive indexes in the range of 1.70 to 2.70 in increments of at least 0.01). The refractive index that gave the minimum sum of squared deviations was obtained as the particle refractive index Np'. That is, this calculation of the particle refractive index was based on the least squares method. (Here, it is preferable to plot the expected particle refractive index on the abscissa and the sum of squared deviations on the ordinate.)

$$f(m) = \frac{\frac{m}{100dp}}{\frac{1-\frac{m}{100}}{dm} + \frac{m}{100dp}}$$ [Math 1]

In Math 1, f(m) is the volume fraction of the particles relative to the total solid content, m is the weight fraction of the particles relative to the total solid content, dm is the specific gravity of the matrix component (here, the specific gravity of γ-glycidoxypropyltrimethoxysilane, 1.07), and dp is the specific gravity of the core-shell type composite oxide fine particles. Here, the specific gravity dp was calculated from the contents of the metal components in the core-shell type composite oxide fine particles, assuming that the specific gravities of $ZrO_2$, $TiO_2$, $SiO_2$, $SnO_2$ and $Al_2O_3$ contained in the particles were 5.60, 4.26, 2.20, 7.00 and 3.97, respectively.

$$Nav = \sqrt{Nm^2 \left(1 + \frac{3 \cdot f(m) \cdot \left(\frac{Np^2 - Nm^2}{Np^2 + 2 \cdot Nm^2}\right)}{1 - f(m) \cdot \left(\frac{Np^2 - Nm^2}{Np^2 + 2 \cdot Nm^2}\right)}\right)}$$ [Math 2]

In Math 2, Nav is the refractive index of the coating film, Nm is the refractive index of the matrix component (here, the refractive index of hydrolyzate of γ-glycidoxypropyltrimethoxysilane, 1.499), and Np is the refractive index of the core-shell type composite oxide fine particles.

This measurement method can measure refractive indexes of particles ranging from 1.45 to 2.70. In particular, the method is suited for the measurement of a refractive index of particles that cannot be measured by the standard liquid method described below, namely, a refractive index that is less than 1.70 or above 2.31. The refractive indexes of the particles determined by this measurement method were substantially in agreement with the refractive indexes determined by the standard liquid method. (This was true in the range of refractive indexes of 1.70 to 2.31).

(9) Test of Photocatalytic Activity of Particles

An organic solvent sol of core-shell type composite oxide fine particles (solid content: 20% by weight) weighing 0.66 g was mixed together with 9.34 g of pure water to give a sample having a solid content of 6.6% by weight. 0.33 g of the sample was mixed together with 9.70 g of a glycerin solution of Sunset Yellow dye having a solid content of 0.02% by weight. The mixture was placed into a quartz cell 1 mm in length, 1 cm in width and 5 cm in height. The quartz cell was sealed and then irradiated with UV rays for 60 minutes with a UV lamp (SLUV-6 manufactured by AS ONE corporation) which had adopted the I-line (wavelength: 365 nm) wavelength, at an irradiation distance of 5.5 cm and an irradiation intensity of 0.4 $mW/cm^2$ (in terms of 365 nm wavelength).

Before and after the UV irradiation, the absorbance ($A_0$ and $A_3$) of the sample at a wavelength of 490 nm was measured. The rate of discoloration of the dye was calculated from the equation below. In addition, the photocatalytic activity of the particles was evaluated based on the following criteria.

Discoloration rate (%)=$(1-A_3/A_0) \times 100$

[Evaluation Criteria]

The smaller the discoloration rate, the more the photocatalytic activity of the particles was suppressed. The photocatalytic activity was evaluated based on the following criteria:
○: Discoloration rate was less than 20%.
Δ: Discoloration rate was from 20% to less than 50%.
x: Discoloration rate was 50% or more.

(10) Evaluation of Rate of Coverage of Core Particle with Shell

The rate of the coverage of the core particle with the shell was evaluated by the following acid stability test with respect to a dispersion liquid of core-shell type composite oxide fine particles.

30.0 g of a dispersion liquid of core-shell type composite oxide fine particles (solid content: 30% by weight) was mixed together with 0.1 g of 12% hydrochloric acid, and the mixture was stirred for 1 hour to give a sample. The sample was placed into a quartz cell having a light path length of 10 mm and was analyzed with a spectrophotometer (V-550 manufactured by JASCO Corporation) to determine the transmittance ($Tr_1$) at 500 nm wavelength. The transmittance ($Tr_0$) of the dispersion liquid of core-shell type composite oxide fine particles had been measured beforehand, and a change in transmittance ($Tr_0-Tr_1$) was calculated. The evaluation was made based on the following criteria.

[Evaluation Criteria]

The smaller the change in transmittance, the higher the rate of the coverage of the core particle with the shell. The evaluation was made based on the following criteria:
○: Change in transmittance was less than 20%.
Δ: Change in transmittance was from 20% to less than 50%.
x: Change in transmittance was 50% or more.

With Respect to Curable Coating Films

(11) Method for Measuring Film Hardness (Bayer Value)

A test lens prepared in Preparation Example in Example and a standard lens were tested with abrasion tester BTM (manufactured by COLTS Laboratories, Inc. in the U.S.) and the haze thereof was measured with a haze meter (NDH2000 manufactured by NIPPON DENSGOKU INDUSTRIES CO., LTD.). The changes in the haze values were studied to determine the Bayer value. The standard lens was commercial plastic lens substrate CR-39 (diethylene glycol bis-allyl carbonate, monomer from PPG being used, refractive index of substrate: 1.60). First, the haze value of each lens was measured. The initial haze value of the standard lens was defined as D (std0), and that of the test lens was defined as D (test0). Each of the lenses was placed on a pan of the abrasion tester, and an abrasive (sand) weighing 500 g was spread on the lens. The lens was then moved left and right 600 times. The initial haze value of the standard lens after the test was defined as D (stdf), and that of the test lens after the test was defined as D (testf). The Bayer value (R) was calculated by the following equation:

$$R=[D(\text{stdf})-D(\text{std0})]/[D(\text{testf})-D(\text{test0})]$$

(13) Method for Evaluating Appearance (Cloudiness) of Coating Films

A fluorescent lamp "Mellow 5N (trade name)" (three-wavelength neutral white fluorescent lamp manufactured by TOSHIBA LIGHTING & TECHNOLOGY CORPORATION) was attached in a box having black inside walls. A sample plate that had a hardcoat layer containing the metal oxide fine particles was placed immediately below the fluorescent lamp so as to be perpendicular thereto. The transparency (the degree of cloudiness) of the hardcoat layer was visually evaluated based on the following criteria:
A: Not cloudy
B: Slightly cloudy
C: Cloudy
D: Markedly cloudy

(13) Scratch Resistance

The surface of a test piece prepared in Preparation Example in Example was rubbed with BONSTAR STEEL WOOL No. 0000 (manufactured by Nippon Steel Wool Co., Ltd.) with a load of 1 kg, over a distance of 3 cm at 50 reciprocations/100 seconds. The level of scratches was visually evaluated based on the following criteria:
A: Substantially no scratches
B: Slight scratches
C: Marked scratches
D: Scratches on almost the entire rubbed area

(14) Test of Weather Resistance of Coating Films

A sample plate on which a hardcoat layer had been formed was subjected to an exposure test with a xenon weather meter (X-75 manufactured by Suga Test Instruments Co., Ltd.). Thereafter, the appearance was observed and an adhesion test was performed. The evaluation was made based on the following criteria. The exposure time was 200 hours for a plate having an antireflective film and 50 hours for a plate without an antireflective film.

Good: 95 or more squares remained attached without being separated.

Bad: Less than 95 squares remained attached without being separated.

(15) Test of Light Resistance of Coating Films

A test piece was irradiated with UV rays with a fade test mercury lamp (H400-E manufactured by TOSHIBA CORPORATION) for 50 hours. The lens color before and after the test was visually observed and evaluated based on the following criteria. The irradiation distance between the lamp and the test piece was 70 mm. The output of the lamp was adjusted such that the surface temperature of the test piece was 45±5° C. This test was performed with respect to a plastic lens in which an antireflective film had been formed on the surface of a hardcoat layer.
○: Substantially no discoloration
Δ: Slight discoloration
x: Marked discoloration

EXAMPLES

The present invention will be described in detail by presenting examples hereinbelow without limiting the scope of the invention.

Example 1

Preparation of Aqueous Dispersion Liquid (CZ-1) of Zirconium-Based Core Particles Zirconium oxychloride octahydrate ($ZrOCl_2 \cdot 8H_2O$, manufactured by TAIYO KOKO CO., LTD.) weighing 0.50 kg was dissolved in 18.58 kg of pure water. To the resultant solution, 17.55 kg of an aqueous KOH solution having a concentration of 10% by weight was added. Thus, a zirconium hydroxide hydrogel ($ZrO_2$ concentration: 1% by weight) was prepared. The zirconium hydroxide hydrogel was washed by an ultrafiltration membrane method until the conductivity was lowered to not more than 0.5 mS/cm.

7.18 kg of an aqueous KOH solution having a concentration of 10% by weight was added to 36.6 kg of the zirconium hydroxide hydrogel having a concentration of 1% by weight in terms of $ZrO_2$. The mixture was sufficiently stirred, and 200 g of an aqueous hydrogen peroxide solution having a concentration of 35% by weight was added thereto. The resultant solution was vigorously bubbled, and became transparent with a pH of 11.4.

Thereafter, 2.00 kg of an aqueous ammonia solution having a concentration of 28.8% by weight was added to the solution, and sufficiently stirred to prepare a precursor slurry of zirconia-based composite oxide fine particles. The slurry was light yellow and had a pH of 13.4. The precursor slurry was placed into an autoclave (100 L, manufactured by TAIATSU TECHNO CORPORATION) and it was hydrothermally treated at 150° C. for 11 hours. The zirconia-based composite oxide fine particles were separated by a centrifugal sedimentation method, then washed sufficiently, and dispersed into ion exchange water. In this manner, 3.59 kg of an aqueous dispersion liquid of the zirconia-based composite oxide fine particles was obtained. The solid content in the aqueous dispersion liquid was 10% by weight in terms of $ZrO_2$.

Next, the aqueous dispersion liquid of the zirconia-based composite oxide fine particles that weighed 3.59 kg was spray dried by being sprayed into a spray dryer (NIRO ATOMIZER manufactured by NIRO). As a result, 0.32 kg of dry powder of the zirconia-based composite oxide fine particles was obtained. The zirconia-based composite oxide fine particles contained in the dry powder had an average particle diameter of about The dry powder weighing 0.32 kg was calcined at 500° C. for 2 hours in an air atmosphere to give 0.30 kg of calcined powder of the zirconia-based composite oxide fine particles.

Of the calcined powder, a 0.21 kg portion was dispersed in 0.19 kg of pure water. To the dispersion liquid, 0.14 kg of a 28.6% aqueous tartaric acid solution and 0.06 kg of an aqueous KOH solution having a concentration of 50% by weight were added, the resultant mixture being sufficiently stirred. Thereafter, quartz beads having a particle diameter of 0.1 to 0.2 mm (high purity silica beads 015 manufactured by MRC UNITECH CO., LTD.) were added. The mixture was fed to a wet crusher (a batch desktop sand mill manufactured by Kanpe Hapio Co., Ltd.), and the calcined powder was subjected to a crushing and dispersing treatment for 180 minutes. Thereafter, the quartz beads were removed with a stainless steel filter having an opening size of 44 μm. The dispersion liquid was then mixed with 1.70 kg of pure water and the mixture was stirred to give 2.26 kg of an aqueous dispersion liquid of the zirconia-based composite oxide fine particles. The solid content in the aqueous dispersion liquid was 11% by weight.

The aqueous dispersion liquid was then washed with ion exchange water through an ultrafiltration membrane. Thereafter, 0.11 kg of an anion exchange resin (SANUPC manufactured by Mitsubishi Chemical Corporation) was added in order to deionize the dispersion liquid. The dispersion liquid was treated with a centrifuge (CR-21G manufactured by Hitachi Koki Co., Ltd.) at 12,000 rpm for 1 hour, thus giving 2.43 kg of an aqueous core particle dispersion liquid (CZ-1) that had a solid concentration of 10% by weight in terms of $ZrO_2$. The core particles contained in the aqueous core particle dispersion liquid (CZ-1) had an average particle diameter of 28 nm and a specific surface area of 153 $m^2/g$.

The contents of metal components in the core particles in terms of oxide of each metal component were 98.28% by weight of $ZrO_2$ and 1.72% by weight of $K_2O$.

Preparation of Aqueous Dispersion Liquid (CSZ-1) of Core-Shell Type Composite Oxide Fine Particles
Preparation of Silicic Acid Solution A commercial water glass (manufactured by AGC Si-Tech Co., Ltd.) weighing 0.62 kg was diluted with pure water and was dealkalized with a cation exchange resin (manufactured by Mitsubishi Chemical Corporation). Thus, 6.00 kg of a silicic acid solution containing 2.0% by weight of silicic acid in terms of $SiO_2$ was obtained. The pH of the silicic acid solution was 2.3.

Step (1)

9.73 kg of ion exchange water was added to 2.43 kg of the aqueous core particle dispersion liquid (CZ-1) (solid content: 10.0% by weight) prepared above. While performing stirring, the mixture was heated to 90° C. To the mixture, 3.24 kg of the silicic acid solution and 2.42 kg of an aqueous sodium aluminate solution having a concentration of 0.67% by weight in terms of $Al_2O_3$ were concurrently gradually added over a period of 4 hours. Here, the weight ratio in terms of oxides, namely, $SiO_2/Al_2O_3$ was 4.0 wherein $SiO_2$ indicates the silicon components contained in the silicic acid solution and $Al_2O_3$ indicates the aluminum components contained in the aqueous sodium aluminate solution. The amount of the shell covering the core particle was 25 parts by weight with respect to 100 parts by weight of the core particle.

Step (2)

The mixture liquid prepared in the above step was stirred for 1 hour while maintaining the temperature at 90° C. Thus, an aqueous dispersion liquid was obtained which contained core-shell type composite oxide fine particles in which the zirconium-based core particles had been covered with the silicon/aluminum composite oxide.

Step (3)

The aqueous dispersion liquid of the core-shell type composite oxide fine particles that was obtained in the above step was mixed with 0.30 kg of a cation exchange resin (DIAION SK1BH manufactured by Mitsubishi Chemical Corporation) so as to adjust the pH to 3.5. Thereafter, without removing the resin, the dispersion liquid was aged for 7 hours while performing stirring and maintaining the temperature at 80° C. After that, the cation exchange resin was separated and removed with a stainless steel filter having an opening size of 44 μm. Thus, 17.83 kg of an aqueous dispersion liquid of the core-shell type composite oxide fine particles that had a solid content of 1.8% by weight was obtained.

The aqueous dispersion liquid of the core-shell type composite oxide fine particles was then cooled to room temperature and was concentrated using an ultrafiltration membrane (SIP-1013 manufactured by Asahi Kasei Corporation), thereby obtaining 1.07 kg of an aqueous dispersion liquid of the core-shell type composite oxide fine particles that had a solid content of 30.0% by weight (hereinafter, referred to as "CSZ-1").

The contents of metal elements in the core-shell type composite oxide fine particles contained in the aqueous dispersion liquid (CSZ-1) of the core-shell type composite oxide fine particles were measured. The results in terms of oxide of each metal element were 78.30% by weight of $ZrO_2$, 18.36% by weight of $SiO_2$, 2.80% by weight of $Al_2O_3$, 0.45% by weight of $Na_2O$, and 0.10% by weight of $K_2O$. These metal element contents gave a specific gravity of the core-shell type composite oxide fine particles of 4.32, and a $SiO_2/Al_2O_3$ ratio in the shell of 6.6. The core-shell type composite oxide fine particles had an average particle diameter of 29 nm, a specific surface area of 204 $m^2/g$, and a negative charge per unit surface area of 0.82 μeq/$m^2$.

The aqueous dispersion liquid (CSZ-1) of the core-shell type composite oxide fine particles had a pH of 3.8, a haze of 6.0%, a viscosity of 7.0 mPa·s, and a viscosity as measured after the 7-day accelerated test at 40° C. of 7.0 mPa·s.

In accordance with the procedures described above in "Method A for measuring refractive index of particles", the refractive index Nav' of the coating film was measured with a spectroscopic ellipsometer, resulting in 1.519, 1.539, 1.554, 1.574, 1.595 and 1.601 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000402. The refractive index of the particles that gave this minimum value was 1.81. Based on these results, the refractive index of the core-shell type composite oxide fine particles was considered to be 1.81. The refractive index of the core-shell type composite oxide fine particles that was determined by the refractive index measurement method B (the standard liquid method) was 1.81.

Preparation of Methanol Dispersion Liquid (CSZ-1-M) of Core-Shell Type Composite Oxide Fine Particles The aqueous dispersion liquid (CSZ-1) of the core-shell type composite oxide fine particles that weighed 1.07 kg was treated with an ultrafiltration membrane apparatus (filter membrane SIP-1013 manufactured by Asahi Kasei Corporation) so as to replace the dispersion medium from water to methanol (manufactured by HAYASHI PURE CHEMICAL IND., LTD., methyl alcohol concentration: 99.9% by weight). Thus, 1.06 kg of a methanol dispersion liquid (CSZ-1-M) of the core-shell type composite oxide fine particles was obtained. The methanol dispersion liquid had a solid concentration of about 30% by weight and a water content of about 0.3% by weight.

The methanol dispersion liquid (CSZ-1-M) of the core-shell type composite oxide fine particles had a pH value of 5.9 as measured after being diluted ten times with distilled water, a haze of 6.5%, a viscosity of 2.0 mPa·s, and a viscosity as measured after the 7-day accelerated test at 40° C. of 2.0 mPa·s.

The core-shell type composite oxide fine particles had a negative charge per unit surface area of 0.82 μeq/$m^2$.

The methanol dispersion liquid of the core-shell type composite oxide fine particles was subjected to the photocatalytic activity test. The evaluation was good (○), with a discoloration rate of 1%. The acid stability test for the methanol dispersion liquid of the core-shell type composite oxide fine particles resulted in a transmittance change of 12%, thus the coverage rate being evaluated good (◯).

Further, the methanol dispersion liquid (CSZ-1-M) of the core-shell type composite oxide fine particles was concentrated with a rotary evaporator to a solid concentration of 40% by weight. The viscosity of the concentrate was 3.4 mPa·s.
Preparation of Hardcoat Layer-Forming Coating Composition (H1)

A vessel was provided which contained a mixture liquid of 149.3 g of γ-glycidoxypropyltrimethoxysilane (Z-6040 manufactured by Dow Corning Toray Co., Ltd.) and 26.4 g of methanol (manufactured by HAYASHI PURE CHEMICAL IND., LTD., methyl alcohol concentration: 99.9% by weight). While performing stirring, 50.9 g of a 0.01 N aqueous hydrochloric acid solution was added dropwise to the mixture liquid. The resultant mixture liquid was stirred at room temperature for a whole day and night in order to hydrolyze the silane compound.

Subsequently, the vessel containing the hydrolysis solution was charged with 224.7 g of methanol, 502.3 g of the methanol dispersion liquid (CSZ-1-M) of the core-shell type composite oxide fine particles that had a solid concentration of 30% by weight, 39.8 g of propylene glycol monomethyl ether (manufactured by The Dow Chemical Company), 3.0 g of tris(2,4-pentanedionate)aluminum III (manufactured by TOKYO CHEMICAL INDUSTRY CO., LTD.), and 0.4 g of a silicone surfactant (L-7001 manufactured by Dow Corning Toray Co., Ltd.) serving as a leveling agent. The resultant mixture was stirred at room temperature for a whole day and night to give a hardcoat layer-forming coating composition (H1) as an optical substrate coating composition.

Example 2

Preparation of Aqueous Dispersion Liquid (CZ-2) of Zirconium-Based Core Particles The procedures in the preparation of the aqueous core particle dispersion liquid (CZ-1) in Example 1 were repeated, except that the precursor slurry of zirconia-based composite oxide fine particles was spray dried without the hydrothermal treatment in an autoclave (100 L, manufactured by TAIATSU TECHNO CORPORATION), and that the resultant dried powder was subjected to the crushing and dispersing treatment with a wet crusher without being calcined. Thus, 2.46 kg of an aqueous core particle dispersion liquid (CZ-2) was obtained which had a solid concentration of 10% by weight in terms of $ZrO_2$. The core particles contained in the aqueous core particle dispersion liquid (CZ-2) had an average particle diameter of 24 nm and a specific surface area of 185 $m^2/g$.

The contents of metal components in the core particles in terms of oxides were determined to be 98.24% by weight of $ZrO_2$ and 1.76% by weight of $K_2O$.
Preparation of Aqueous Dispersion Liquid (CSZ-2) of Core-Shell Type Composite Oxide Fine Particles The procedures in the preparation of the aqueous dispersion liquid (CSZ-1) of core-shell type composite oxide fine particles in Example 1 were repeated, except that the aqueous core particle dispersion liquid (CZ-1) was replaced by the aqueous core particle dispersion liquid (CZ-2) prepared in this example. Thus, 1.08 kg of an aqueous dispersion liquid (CSZ-2) of core-shell type composite oxide fine particles was obtained which had a solid content of 30.0% by weight.

Here, the weight ratio in terms of oxides, namely, $SiO_2/Al_2O_3$ was 4.0 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 25.0 parts by weight with respect to 100 parts by weight of the core particle.

The contents of metal components in the core-shell type composite oxide fine particles contained in the aqueous dispersion liquid (CSZ-2) of the core-shell type composite oxide fine particles were measured. The results in terms of oxide of each metal element were 78.60% by weight of $ZrO_2$, 18.52% by weight of $SiO_2$, 2.84% by weight of $Al_2O_3$, 0.48% by weight of $Na_2O$ and 0.13% by weight of $K_2O$. These metal contents gave a specific gravity of the metal oxide fine particles of 4.31, and a $SiO_2/Al_2O_3$ weight ratio of 6.5.

The core-shell type composite oxide fine particles had an average particle diameter of 25 nm, a specific surface area of 235 $m^2/g$, and a negative charge of 0.75 μeq/$m^2$.

The aqueous dispersion liquid (CSZ-2) of the core-shell type composite oxide fine particles had a pH of 4.0, a haze of 2.7%, a viscosity of 7.2 mPa·s, and a viscosity as measured after the 7-day accelerated test at 40° C. of 7.2 mPa·s.

In accordance with the procedures described above in "Method A for measuring refractive index of particles", the refractive index Nav' of the coating film was measured with a spectroscopic ellipsometer, resulting in 1.509, 1.529, 1.550, 1.571, 1.587 and 1.595 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000107. The refractive index of the particles that gave this minimum value was 1.79. Based on these results, the refractive index of the core-shell type composite oxide fine particles was considered to be 1.79. The refractive index of the core-shell type composite oxide that was determined by the refractive index measurement method B (the standard liquid method) was 1.79.
Preparation of Methanol Dispersion Liquid (CSZ-2-M) of Core-Shell Type Composite Oxide Fine Particles The procedures in the preparation of the methanol dispersion liquid (CSZ-1-M) of core-shell type hell composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (CSZ-2) of the core-shell type composite oxide fine particles (solid content: 30.0% by weight) prepared in this example. Thus, 1.07 kg of a methanol dispersion liquid (CSZ-2-M) of the core-shell type composite oxide fine particles was obtained which had a solid content of 30.0% by weight. The methanol dispersion liquid had a water content of about 0.3% by weight.

The methanol dispersion liquid had a pH value of 6.0 as measured after being diluted ten times, a haze of 3.1%, a viscosity of 2.1 mPa·s, and a viscosity as measured after the 7-day accelerated test at 40° C. of 2.1 mPa·s.

The core-shell type composite oxide fine particles had a negative charge per unit surface area of 0.75 μeq/$m^2$.

The methanol dispersion liquid of the core-shell type composite oxide fine particles was subjected to the photocatalytic activity test. The evaluation was good (◯), with a discoloration rate of 1%. The acid stability test for the methanol dispersion liquid of the core-shell type composite oxide fine particles resulted in a transmittance change of 18%, thus the coverage rate being evaluated good (◯).

Further, the methanol dispersion liquid (CSZ-2-M) of the core-shell type composite oxide fine particles was concentrated with a rotary evaporator to a solid concentration of 40% by weight. The viscosity of the concentrate was 5.9 mPa·s.

Preparation of Hardcoat Layer-Forming Coating Composition (H2)

A hardcoat layer-forming coating composition (H2) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 501.1 g of the methanol dispersion liquid (CSZ-2-M) of the core-shell type composite oxide fine particles.

Example 3

Preparation of Aqueous Dispersion Liquid (CT-1) of Titanium-Based Core Particles 6.56 kg of an aqueous titanium tetrachloride solution containing 7.75% by weight of titanium tetrachloride (manufactured by OSAKA Titanium technologies Co., Ltd.) in terms of $TiO_2$ and 2.54 kg of aqueous ammonia containing 15% by weight of ammonia (manufactured by Ube Industries, Ltd.) were mixed with each other to give a white slurry having a pH of 9.5. This slurry was then filtrated and washed with ion exchange water to afford 5.35 kg of a water-containing titanic acid cake having a solid content of 10% by weight.

The cake was subsequently mixed with 6.12 kg of aqueous hydrogen peroxide containing 35% by weight of hydrogen peroxide (manufactured by MITSUBISHI GAS CHEMICAL COMPANY, INC.) and 20.00 kg of ion exchange water. The mixture was heated at 80° C. for 1 hour while performing stirring, and 22.04 kg of ion exchange water was added, thus resulting in 53.51 kg of an aqueous peroxytitanic acid solution containing 1% by weight of peroxytitanic acid in terms of $TiO_2$. This aqueous peroxytitanic acid solution was a transparent yellow-brown solution having a pH of 8.5.

Subsequently, 53.51 kg of the aqueous peroxytitanic acid solution was mixed together with 2.60 kg of a cation exchange resin (manufactured by Mitsubishi Chemical Corporation). To the resultant mixture, 6.69 kg of an aqueous potassium stannate solution containing 1% by weight of potassium stannate (manufactured by Showa Kako Corporation) in terms of $SnO_2$ was gradually added while performing stirring.

The cation exchange resin which had captured ions such as potassium ions was then separated from the mixture. Thereafter, the mixture was mixed together with 0.65 kg of a silica sol which contained 15% by weight of silica fine particles having an average particle diameter of 7 nm (manufactured by JGC Catalysts and Chemicals Ltd.) and 9.15 kg of ion exchange water. The resultant mixture was heated in an autoclave (120L, manufactured by Taiatsu Techno Corporation) at 165° C. for 18 hours.

The resultant aqueous mixture solution was cooled to room temperature and was concentrated with an ultrafiltration membrane apparatus (ACV-3010 manufactured by Asahi Kasei Corporation) to give 7.00 kg of an aqueous dispersion liquid of titania-based composite oxide fine particles having a solid content of 10% by weight.

Next, the aqueous dispersion liquid of the titania-based composite oxide fine particles that weighed 7.00 kg was spray dried by being sprayed into a spray dryer (NIRO ATOMIZER manufactured by NIRO). As a result, 0.63 kg of dry powder composed of the titania-based composite oxide fine particles with an average particle diameter of about 2 μm was obtained.

The dry powder of the titania-based composite oxide fine particles weighing 0.63 kg was calcined at 500° C. for 2 hours in an air atmosphere to give 0.59 kg of calcined powder of the titania-based composite oxide fine particles.

Of the calcined powder of the titania-based composite oxide fine particles, a 0.21 kg portion was dispersed in 0.39 kg of pure water. To the dispersion liquid, 0.14 kg of an aqueous tartaric acid solution having a concentration of 28.6 and 0.06 kg of an aqueous KOH solution having a concentration of 50% by weight were added, the resultant mixture being sufficiently stirred. Thereafter, quartz beads having a particle diameter of 0.1 to 0.2 mm (high purity silica beads 015 manufactured by MRC UNITECH CO., LTD.) were added. The mixture was fed to a wet crusher (a batch desktop sand mill manufactured by Kanpe Hapio Co., Ltd.), and the calcined powder of the titania-based composite oxide fine particles was subjected to a crushing and dispersing treatment for 180 minutes. Thereafter, the quartz beads were separated and removed with a stainless steel filter having an opening size of 44 μm. The dispersion liquid was then mixed together with 1.37 kg of pure water and the mixture was stirred to give 1.73 kg of an aqueous dispersion liquid of the titania-based composite oxide fine particles having a solid content of 11% by weight.

The aqueous dispersion liquid was then washed with ion exchange water through an ultrafiltration membrane. Thereafter, 0.09 kg of an anion exchange resin (SANUPC manufactured by Mitsubishi Chemical Corporation) was added in order to deionize the dispersion liquid. The dispersion liquid was treated with a centrifuge (CR-21G manufactured by Hitachi Koki Co., Ltd.) at 12,000 rpm for 1 hour, thus giving 1.87 kg of an aqueous core particle dispersion liquid (CT-1) that had a concentration of 10% by weight in terms of $TiO_2$.

The core particles contained in the aqueous core particle dispersion liquid had an average particle diameter of 25 nm and a specific surface area of 212 $m^2/g$.

The contents of metal components in the core particles in terms of oxide of each metal component were 77.20% by weight of $TiO_2$, 9.73% by weight of $SnO_2$, 11.46% by weight of $SiO_2$ and 1.61% by weight of $K_2O$.

Preparation of Aqueous Dispersion Liquid (CST-1) of Core-Shell Type Composite Oxide Fine Particles The procedures in the preparation of the aqueous dispersion liquid (CSZ-1) of core-shell type composite oxide fine particles in Example 1 were repeated, except that the aqueous core particle dispersion liquid (CZ-1) (solid content: 10.0% by weight) was replaced by the aqueous core particle dispersion liquid (CT-1) (solid content: 10.0% by weight) prepared in this example. Thus, 0.82 kg of an aqueous dispersion liquid (CST-1) of core-shell type composite oxide fine particles was obtained which had a solid content of 30.0% by weight.

Here, the weight ratio in terms of oxides, namely, $SiO_2/Al_2O_3$ was 4.0 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 25.0 parts by weight with respect to 100 parts by weight of the core particle.

The contents of metal components in the core-shell type composite oxide fine particles contained in the aqueous dispersion liquid (CST-1) of the core-shell type composite oxide fine particles were measured. The results in terms of oxide of each metal element were 58.94% by weight of $TiO_2$, 6.74% by weight of $SnO_2$, 34.72% by weight of $SiO_2$, 4.01% by weight of $Al_2O_3$, 0.47% by weight of $Na_2O$, and 0.12% by weight of $K_2O$. These metal contents gave a specific gravity of the core-shell type composite oxide fine particles of 3.27, and a $SiO_2/Al_2O_3$ weight ratio in the shell of 6.7.

The core-shell type composite oxide fine particles had an average particle diameter of 26 nm, a specific surface area of 278 m$^2$/g, and a negative charge of 0.57 μeq/m$^2$.

The aqueous dispersion liquid of the core-shell type composite oxide fine particles had a pH of 3.3, a haze of 9.9%, a viscosity of 6.8 mPa·s, and a viscosity as measured after the 7-day accelerated test at 40° C. of 6.8 mPa·s.

In accordance with the procedures described above in "Method A for measuring refractive index of particles", the refractive index Nav' of the coating film was measured with a spectroscopic ellipsometer, resulting in 1.541, 1.561, 1.576, 1.596, 1.615 and 1.619 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.001378. The refractive index of the particles that gave this minimum value was 1.83. Based on these results, the refractive index of the core-shell type composite oxide fine particles was considered to be 1.83. The refractive index of the core-shell type composite oxide fine particles that was determined by the refractive index measurement method B (the standard liquid method) was 1.83.

Preparation of Methanol Dispersion Liquid (CST-1-M) of Core-Shell Type Composite Oxide Fine Particles The procedures in the preparation of the methanol dispersion liquid (CSZ-1-M) of core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (CST-1) of the core-shell type composite oxide fine particles (solid content: 30.0% by weight) prepared in this example. Thus, 0.81 kg of a methanol dispersion liquid (CST-1-M) of the core-shell type composite oxide fine particles was obtained which had a solid content of 30.0% by weight. The methanol dispersion liquid had a water content of about 0.3% by weight.

The methanol dispersion liquid had a pH value of 5.2 as measured after being diluted ten times, a haze of 9.1%, a viscosity of 2.4 mPa·s, and a viscosity as measured after the 7-day accelerated test at 40° C. of 2.4 mPa·s.

The core-shell type composite oxide fine particles had a negative charge per unit surface area of 0.57 μeq/m$^2$.

The methanol dispersion liquid of the core-shell type composite oxide fine particles was subjected to the photocatalytic activity test. The evaluation was good (◯), with a discoloration rate of 6%. The acid stability test for the methanol dispersion liquid of the core-shell type composite oxide fine particles resulted in a transmittance change of 10%, thus the coverage rate being evaluated good (◯).

Further, the methanol dispersion liquid (CST-1-M) of the core-shell type composite oxide fine particles was concentrated with a rotary evaporator to a solid concentration of 40% by weight. The viscosity of the concentrate was 3.8 mPa·s.

Preparation of Hardcoat Layer-Forming Coating Composition (H3)

A hardcoat layer-forming coating composition (H3) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 395.3 g of the methanol dispersion liquid (CST-1-M) of the core-shell type composite oxide fine particles.

Example 4

Preparation of Aqueous Dispersion Liquid (CT-2) of Titanium-Based Core Particles 7.63 kg of an aqueous titanium tetrachloride solution containing 7.75% by weight of titanium tetrachloride (manufactured by OSAKA Titanium technologies Co., Ltd.) in terms of $TiO_2$ and 2.96 kg of aqueous ammonia containing 15% by weight of ammonia (manufactured by Ube Industries, Ltd.) were mixed with each other to give a white slurry having a pH of 9.5. This slurry was then filtrated and washed with ion exchange water to afford 6.22 kg of a water-containing titanic acid cake having a solid content of 10% by weight.

The cake was subsequently mixed together with 7.11 kg of aqueous hydrogen peroxide containing 35% by weight of hydrogen peroxide (manufactured by MITSUBISHI GAS CHEMICAL COMPANY, INC.) and 20.00 kg of ion exchange water. The mixture was heated at 80° C. for 1 hour while performing stirring, and 28.89 kg of ion exchange water was added, thus resulting in 62.22 kg of an aqueous peroxytitanic acid solution containing 1% by weight of peroxytitanic acid in terms of $TiO_2$. This aqueous peroxytitanic acid solution was a transparent yellow-brown solution having a pH of 8.4.

Subsequently, 62.22 kg of the aqueous peroxytitanic acid solution was mixed together with 3.00 kg of a cation exchange resin (manufactured by Mitsubishi Chemical Corporation). To the resultant mixture, 7.78 kg of an aqueous potassium stannate solution containing 1% by weight of potassium stannate (manufactured by Showa Kako Corporation) in terms of $SnO_2$ was gradually added while performing stirring.

The cation exchange resin which had captured ions such as potassium ions was then separated from the mixture. Thereafter, the mixture was heated in an autoclave (120L, manufactured by Taiatsu Techno Corporation) at 165° C. for 18 hours.

The resultant aqueous mixture solution was cooled to room temperature and was concentrated with an ultrafiltration membrane apparatus (ACV-3010 manufactured by Asahi Kasei Corporation) to give 7.00 kg of an aqueous dispersion liquid of titania-based composite oxide fine particles having a solid content of 10% by weight.

Next, the aqueous dispersion liquid of the titania-based composite oxide fine particles that weighed 7.00 kg was spray dried by being sprayed into a spray dryer (NIRO ATOMIZER manufactured by NIRO). As a result, 0.64 kg of dry powder composed of the titania-based composite oxide fine particles with an average particle diameter of about 2 μm was obtained.

The dry powder weighing 0.64 kg was calcined at 500° C. for 2 hours in an air atmosphere to give 0.59 kg of calcined powder of the titania-based composite oxide fine particles.

Of the calcined powder, a 0.21 kg portion was dispersed in 0.40 kg of pure water. To the dispersion liquid, 0.14 kg of an aqueous tartaric acid solution having a concentration of 28.6% and 0.06 kg of an aqueous KOH solution having a concentration of 50% by weight were added, the resultant mixture being sufficiently stirred. Thereafter, quartz beads having a particle diameter of 0.1 to 0.2 mm (high purity silica beads 015 manufactured by MRC UNITECH CO., LTD.) were added. The mixture was fed to a wet crusher (a batch desktop sand mill manufactured by Kanpe Hapio Co., Ltd.), and the calcined powder of the titanium-based composite oxide fine particles was subjected to a crushing and dispersing treatment for 180 minutes. Thereafter, the quartz beads were separated and removed with a stainless steel filter having an opening size of 44 μm. The dispersion liquid was then mixed together with 1.40 kg of pure water and the mixture was stirred to give 1.77 kg of an aqueous dispersion liquid of the titania-based composite oxide fine particles having a solid content of 11% by weight.

The aqueous dispersion liquid was then washed with ion exchange water through an ultrafiltration membrane. Thereafter, 0.09 kg of an anion exchange resin (SANUPC manufactured by Mitsubishi Chemical Corporation) was added in order to deionize the dispersion liquid. The dispersion liquid was treated with a centrifuge (CR-21G manufactured by Hitachi Koki Co., Ltd.) at 12,000 rpm for 1 hour, thus giving 1.91 kg of an aqueous core particle dispersion sol (CT-2) that had a concentration of 10% by weight in terms of $TiO_2$. The core particles contained in the aqueous core particle dispersion liquid (CT-2) had an average particle diameter of 26 nm and a specific surface area of 153 $m^2/g$.

The contents of metal components in the core particles in terms of oxide of each metal component were 87.29% by weight of $TiO_2$, 10.91% by weight of $SnO_2$ and 1.80% by weight of $K_2O$.

Preparation of Aqueous Dispersion Liquid (CST-2) of Core-Shell Type Composite Oxide Fine Particles The procedures in the preparation of the aqueous dispersion liquid (CSZ-1) of core-shell type composite oxide fine particles in Example 1 were repeated, except that the aqueous core particle dispersion liquid (CZ-1) (solid content: 10.0% by weight) was replaced by the aqueous core particle dispersion liquid (CT-2) (solid content: 10.0% by weight) prepared in this example. Thus, 0.84 kg of an aqueous dispersion liquid (CST-2) of core-shell type composite oxide fine particles was obtained which had a solid content of 30.0% by weight.

Here, the weight ratio in terms of oxides, namely, $SiO_2/Al_2O_3$ was 4.0 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 25.0 parts by weight with respect to 100 parts by weight of the core particle.

The contents of metal components in the core-shell type composite oxide fine particles contained in the aqueous dispersion liquid (CST-2) of the core-shell type composite oxide fine particles were measured. The results in terms of oxide of each metal element were 65.47% by weight of $TiO_2$, 8.18% by weight of $SnO_2$, 18.44% by weight of $SiO_2$, 2.83% by weight of $Al_2O_3$, 0.46% by weight of $Na_2O$, and 0.11% by weight of $K_2O$. These metal contents gave a specific gravity of the metal oxide fine particles of 3.70, and a $SiO_2/Al_2O_3$ weight ratio in the shell of 6.5.

The core-shell type composite oxide fine particles had an average particle diameter of 27 nm, a specific surface area of 204 $m^2/g$, and a negative charge of 0.70 μeq/$m^2$.

The aqueous dispersion liquid of the core-shell type composite oxide fine particles had a pH of 3.7, a haze of 9.9%, a viscosity of 6.8 mPa·s, and a viscosity as measured after the 7-day accelerated test at 40° C. of 6.8.

In accordance with the procedures described above in "Method A for measuring refractive index of particles", the refractive index Nav' of the coating film was measured with a spectroscopic ellipsometer, resulting in 1.552, 1.601, 1.654, 1.702, 1.778 and 1.796 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000619. The refractive index of the particles that gave this minimum value was 2.37. Based on these results, the refractive index of the core-shell type composite oxide fine particles was considered to be 2.37.

Preparation of Methanol Dispersion Liquid (CST-2-M) of Core-Shell Type Composite Oxide Fine Particles The procedures in the preparation of the methanol dispersion liquid (CSZ-1) of core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (CST-2) of the core-shell type composite oxide fine particles (solid content: 30.0% by weight) prepared in this example. Thus, 0.83 kg of a methanol dispersion liquid (CST-2-M) of the core-shell type composite oxide fine particles was obtained which had a solid content of 30.0% by weight. The methanol dispersion liquid had a water content of about 0.3% by weight.

The methanol dispersion liquid had a pH value of 5.9 as measured after being diluted ten times, a haze of 10.4%, a viscosity of 1.9 mPa·s, and a viscosity as measured after the 7-day accelerated test at 40° C. of 1.9 mPa·s The core-shell type composite oxide fine particles had a negative charge per unit surface area of 0.70 μeq/$m^2$.

The methanol dispersion liquid of the core-shell type composite oxide fine particles was subjected to the photocatalytic activity test. The evaluation was good (○), with a discoloration rate of 12%. The acid stability test for the methanol dispersion liquid of the core-shell type composite oxide fine particles resulted in a transmittance change of 14%, thus the coverage rate being evaluated good (○).

Further, the methanol dispersion liquid (CST-2-M) of the core-shell type composite oxide fine particles was concentrated with a rotary evaporator to a solid concentration of 40% by weight. The viscosity of the concentrate was 3.0 mPa·s.

Preparation of Hardcoat Layer-Forming Coating Composition (H4)

A hardcoat layer-forming coating composition (H4) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 309.8 g of the methanol dispersion liquid (CST-2-M) of the core-shell type composite oxide fine particles prepared in this example.

Preparation of Hardcoat Layer-Forming Coating Composition (H10)

A hardcoat layer-forming coating composition (H10) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 516.3 g of the methanol dispersion liquid (CST-2-M) of the core-shell type composite oxide fine particles.

Preparation of Primer Layer-Forming Coating Composition (P1)

A vessel was provided that contained 142.1 g of a commercial thermoplastic resin, namely polyurethane emulsion "SUPER FLEX 150" (manufactured by DAI-ICHI KOGYO SEIYAKU CO., LTD., water-dispersed urethane elastomer solid content: 30%). The vessel was charged with 227.3 g of the methanol dispersion liquid (CST-2-M) of the core-shell type composite oxide fine particles prepared in Example 4 and 97.1 g of ion exchange water. The mixture was stirred for 1 hour.

The resultant mixture was then mixed together with 531.0 g of methanol (manufactured by HAYASHI PURE CHEMICAL IND., LTD., methyl alcohol concentration: 99.9% by weight) and 0.3 g of a silicone surfactant (L-7604 manufactured by Dow Corning Toray Co., Ltd.) serving as a leveling agent. The mixture was stirred at room temperature for a whole day and night to give a primer layer-forming coating composition (P-1).

Example 5

Preparation of Aqueous Dispersion Liquid (CN-1) of Tin-Based Core Particles

Ammonium nitrate weighing 5.2 g and 15% aqueous ammonia weighing 8.0 g were added to 3.22 kg of ion exchange water. The mixture was stirred and heated to 50° C. A solution of 0.61 kg of potassium stannate dissolved in 1.72 kg of ion exchange water was added to the mixture with use of a roller pump over a period of 10 hours. During the addition, a 10% by weight nitric acid solution was added with a pH controller so as to maintain the pH at 8.8. After the completion of the addition, the temperature was kept at 50° C. for 1 hour and thereafter a 10% by weight nitric acid solution was added so as to lower the pH to 3.0.

The liquid was then washed with pure water through an ultrafiltration membrane until the conductivity of the filtrate water reached 10 μS/cm, and the liquid was concentrated with an ultrafiltration membrane and was collected. The amount of the collected liquid was 2.10 kg and the solid ($SnO_2$) concentration was 12% by weight. Thereafter, 18.6 g of an aqueous phosphoric acid solution having a concentration of 16% by weight was added to the slurry. The mixture was stirred for 0.5 hours to give a precursor slurry of tin oxide-based composite oxide fine particles.

Next, the precursor slurry of tin oxide-based composite oxide fine particles that weighed 2.12 kg was spray dried by being sprayed into a spray dryer (NIRO ATOMIZER manufactured by NIRO). As a result, 0.28 kg of dry powder composed of tin oxide-based composite oxide fine particles with an average particle diameter of about 2 μm was obtained.

The dry powder of tin oxide-based composite oxide fine particles weighing 0.28 kg was calcined at 700° C. for 2 hours in an air atmosphere to give 0.25 kg of calcined powder of the tin oxide-based composite oxide fine particles.

Of the calcined powder of the tin oxide-based composite oxide fine particles, a 0.22 kg portion was dispersed in 0.39 kg of pure water. To the dispersion liquid, 1.40 g of an aqueous KOH solution having a concentration of 50% by weight was added, the resultant mixture being sufficiently stirred. Thereafter, quartz beads having a particle diameter of 0.1 to 0.2 mm: (high purity silica beads 015 manufactured by MRC UNITECH CO., LTD.) were added. The mixture was fed to a wet crusher (a batch desktop sand mill manufactured by Kanpe Hapio Co., Ltd.), and the calcined powder of the tin oxide-based composite oxide fine particles was subjected to a crushing and dispersing treatment for 180 minutes. Thereafter, the quartz beads were separated and removed with a stainless steel filter having an opening size of 44 μm. The dispersion liquid was then mixed together with 1.76 kg of pure water and the mixture was stirred to give 2.34 kg of an aqueous dispersion liquid of the tin oxide-based composite oxide fine particles having a solid content of 11% by weight.

The aqueous dispersion liquid was treated with a centrifuge (CR-21G manufactured by Hitachi Koki Co., Ltd.) at 12,000 rpm for 1 hour, thus giving 2.53 kg of an aqueous core particle dispersion liquid (CN-1) that had a concentration of 10% by weight in terms of $SnO_2$. The core particles contained in the aqueous core particle dispersion liquid (CN-1) had an average particle diameter of 35 nm and a specific surface area of 70 m²/g.

The contents of metal components in the core particles in terms of oxide of each metal component were 97.51% by weight of $SnO_2$, 1.00% by weight of $P_2O_5$ and 1.51% by weight of $K_2O$.

Preparation of Aqueous Dispersion Liquid (CSN-1) of Core-Shell Type Composite Oxide Fine Particles The procedures in the preparation of the aqueous dispersion liquid (CSZ-2) of core-shell type composite oxide fine particles in Example 1 were repeated, except that the aqueous core particle dispersion liquid (CZ-1) (solid content: 10.0% by weight) was replaced by the aqueous core particle dispersion liquid (CN-1) (solid content: 10.0% by weight) prepared in this example. Thus, 1.11 kg of an aqueous dispersion liquid (CSN-1) of core-shell type composite oxide fine particles was obtained which had a solid content of 30.0% by weight.

Here, the weight ratio in terms of oxides, namely, $SiO_2$/$Al_2O_3$ was 4.0 wherein $SiO_2$ indicates the silicon components contained in the silicic acid solution silicic acid used in the production of shell and $Al_2O_3$ indicates the aluminum components contained in the aqueous sodium aluminate solution used in the production of shell. The amount of the shell covering the core particle was 25.0 parts by weight with respect to 100 parts by weight of the core particle.

The contents of metal components in the core-shell type composite oxide fine particles contained in the aqueous dispersion liquid (CSN-1) of the core-shell type composite oxide fine particles were measured. The results in terms of oxide of each metal element were 73.85% by weight of $SnO_2$, 0.80% by weight of $P_2O_5$, 21.53% by weight of $SiO_2$, 3.34% by weight of $Al_2O_3$, 0.43% by weight of $Na_2O$ and 0.10% by weight of $K_2O$. These metal contents gave a specific gravity of the metal oxide fine particles of 4.66, and a $SiO_2$/$Al_2O_3$ weight ratio in the shell of 6.4.

The core-shell type composite oxide fine particles had an average particle diameter of 36 nm, a specific surface area of 136 m²/g, and a negative charge of 0.92 μeq/m².

The aqueous dispersion liquid (CSN-1) of the core-shell type composite oxide fine particles had a pH of 3.6, a haze of 2.3%, a viscosity of 8.0 mPa·s, and a viscosity as measured after the 7-day accelerated test at 40° C. of 8.1 mPa·s.

In accordance with the procedures described above in "Method A for measuring refractive index of particles", the refractive index Nav' of the coating film was measured with a spectroscopic ellipsometer, resulting in 1.509, 1.520, 1.532, 1.541, 1.551 and 1.558 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000059. The refractive index of the particles that gave this minimum value was 1.68. Based on these results, the refractive index of the core-shell type composite oxide fine particles was considered to be 1.68. The refractive index of the core-shell type composite oxide fine particles that was determined by the refractive index measurement method B (the standard liquid method) was 1.68.

Preparation of Methanol Dispersion Liquid (CSN-1-M) of Core-Shell Type Composite Oxide Fine Particles The procedures in the preparation of the methanol dispersion liquid (CSZ-1-M) of core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (CSN-1) of the core-shell type composite oxide fine particles (solid content: 30.0% by weight) prepared in this example. Thus, 1.10 kg of a methanol dispersion liquid (CSN-1-M) of the core-shell type composite oxide fine particles was obtained which had a solid content of 30.0% by weight. The methanol dispersion liquid had a water content of about 0.3% by weight.

The methanol dispersion liquid had a pH value of 6.4 as measured after being diluted ten times, a haze of 2.7%, a viscosity of 2.8 mPa·s, and a viscosity as measured after the 7-day accelerated test at 40° C. of 2.9 mPa·s.

The core-shell type composite oxide fine particles had a negative charge per unit surface area of 0.92 μeq/$m^2$.

The methanol dispersion liquid of the core-shell type composite oxide fine particles was subjected to the photocatalytic activity test. The evaluation was good (○), with a discoloration rate of 2%. The acid stability test for the methanol dispersion liquid of the core-shell type composite oxide fine particles resulted in a transmittance change of 18%, thus the coverage rate being evaluated good (○).

Further, the methanol dispersion liquid (CSN-1-M) of the core-shell type composite oxide fine particles was concentrated with a rotary evaporator to a solid concentration of 40% by weight. The viscosity of the concentrate was 8.2 mPa·s.

Preparation of Hardcoat Layer-Forming Coating Composition (H5)

A hardcoat layer-forming coating composition (H5) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 541.9 g of the methanol dispersion liquid (CSN-1-M) of the core-shell type composite oxide fine particles prepared in this example.

Example 6

Preparation of Aqueous Dispersion Liquid (CSZ-3) of Core-Shell Type Composite Oxide Fine Particles The procedures in the preparation of the aqueous dispersion liquid (CSZ-1) of core-shell type composite oxide fine particles in Example 1 were repeated, except that the step (1) was performed in a manner such that the amounts of the silicic acid solution and the aqueous sodium aluminate solution which were mixed to the aqueous core particle dispersion liquid (CZ-1) prepared in Example 1 were changed from 3.24 kg to 3.64 kg and from 2.42 kg to 1.24 kg, respectively. Thus, 1.02 kg of an aqueous dispersion liquid (CSZ-3) of core-shell type composite oxide fine particles was obtained which had a solid content of 30.0% by weight.

Here, the weight ratio in terms of oxides, namely, $SiO_2/Al_2O_3$ was 8.80 wherein $SiO_2$ indicates the silicon components contained in the silicic acid solution and $Al_2O_3$ indicates the aluminum components contained in the aqueous sodium aluminate solution. The amount of the shell covering the core particle was 25.0 parts by weight with respect to 100 parts by weight of the core particle.

The contents of metal components in the core-shell type composite oxide fine particles contained in the aqueous dispersion liquid (CSZ-3) of the core-shell type composite oxide fine particles were measured. The results in terms of oxide of each metal element were 74.84% by weight of $ZrO_2$, 23.15% by weight of $SiO_2$, 1.65% by weight of $Al_2O_3$, 0.25% by weight of $Na_2O$, and 0.11% by weight of $K_2O$. These metal contents gave a specific gravity of the metal oxide fine particles of 4.10, and a $SiO_2/Al_2O_3$ weight ratio in the shell of 14.0.

The core-shell type composite oxide fine particles had an average particle diameter of 29 nm, a specific surface area of 195 $m^2$/g, and a negative charge of 0.66 μeq/$m^2$.

The aqueous dispersion liquid (CSZ-3) of the core-shell type composite oxide fine particles had a pH of 3.4, a haze of 6.3%, a viscosity of 7.4 mPa·s, and a viscosity as measured after the 7-day accelerated test at 40° C. of 7.2 mPa·s In accordance with the procedures described above in "Method A for measuring refractive index of particles", the refractive index Nav' of the coating film was measured with a spectroscopic ellipsometer, resulting in 1.518, 1.538, 1.555, 1.575, 1.598 and 1.604 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000139. The refractive index of the particles that gave this minimum value was 1.81. Based on these results, the refractive index of the core-shell type composite oxide fine particles was considered to be 1.81. The refractive index of the core-shell type composite oxide fine particles that was determined by the refractive index measurement method B (the standard liquid method) was 1.81.

Preparation of Methanol Dispersion Liquid (CSZ-3-M) of Core-Shell Type Composite Oxide Fine Particles The procedures in the preparation of the methanol dispersion liquid (CSZ-1-M) of core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (CSZ-3) of the core-shell type composite oxide fine particles (solid content: 30.0% by weight) prepared in this example. Thus, 1.01 kg of a methanol dispersion liquid (CSZ-3-M) of the core-shell type composite oxide fine particles was obtained which had a solid content of 30.0% by weight. The methanol dispersion liquid had a water content of about 0.3% by weight.

The methanol dispersion liquid had a pH value of 5.6 as measured after being diluted ten times, a haze of 6.8%, a viscosity of 2.3 mPa·s, and a viscosity as measured after the 7-day accelerated test at 40° C. of 2.4 mPa·s.

The core-shell type composite oxide fine particles had a negative charge per unit surface area of 0.66 μeq/$m^2$.

The methanol dispersion liquid of the core-shell type composite oxide fine particles was subjected to the photocatalytic activity test. The evaluation was good (○), with a discoloration rate of 1%. The acid stability test for the methanol dispersion liquid of the core-shell type composite oxide fine particles resulted in a transmittance change of 15%, thus the coverage rate being evaluated good (○).

Further, the methanol dispersion sol (CSZ-3) of the core-shell type composite oxide fine particles was concentrated with a rotary evaporator to a solid concentration of 40% by weight. The viscosity of the concentrate was 37.6 mPa·s.

Preparation of Hardcoat Layer-Forming Coating Composition (H6)

A hardcoat layer-forming coating composition (H6) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 476.7 g of the methanol dispersion liquid (CSZ-3-M) of the core-shell type composite oxide fine particles prepared in this examples.

Example 7

Preparation of Aqueous Dispersion Liquid (CSZ-4) of Core-Shell Type Composite Oxide Fine Particles The procedures in the preparation of the aqueous dispersion liquid (CSZ-1) of core-shell type composite oxide fine particles in Example 1 were repeated, except that the step (1) was performed in a manner such that the amounts of the silicic acid solution and the aqueous sodium aluminate solution which were mixed to the aqueous core particle dispersion liquid (CZ-1) prepared in Example were changed from 3.24 kg to 2.70 kg and from 2.42 kg to 4.04 kg, respectively. Thus, 1.13 kg of an aqueous dispersion liquid (CSZ-4) of core-shell type composite oxide fine particles was obtained which had a solid content of 30.0% by weight.

Here, the weight ratio in terms of oxides, namely, $SiO_2/Al_2O_3$ was 2.0 wherein $SiO_2$ indicates the silicon components contained in the aqueous silicic acid solution and $Al_2O_3$ indicates the aluminum components contained in the aqueous sodium aluminate solution. The amount of the shell covering the core particle was 25.0 parts by weight with respect to 100 parts by weight of the core particle.

The contents of metal components in the core-shell type composite oxide fine particles contained in the aqueous dispersion liquid (CSZ-4) of the core-shell type composite oxide fine particles were measured. The results in terms of oxide of each metal element were 75.04% by weight of $ZrO_2$, 18.55% by weight of $SiO_2$, 5.75% by weight of $Al_2O_3$, 0.51% by weight of $Na_2O$ and 0.15% by weight of $K_2O$. These metal contents gave a specific gravity of the metal oxide fine particles of 4.27, and a $SiO_2/Al_2O_3$ weight ratio in the shell of 3.2.

The core-shell type composite oxide fine particles had an average particle diameter of 29 nm, a specific surface area of 213 m$^2$/g, and a negative charge of 1.46 μeq/m$^2$.

The aqueous dispersion liquid of the core-shell type composite oxide fine particles had a pH of 4.0, a haze of 5.8%, a viscosity of 7.5 mPa·s, and a viscosity as measured after the 7-day accelerated test at 40° C. of 7.5 mPa·s.

In accordance with the procedures described above in "Method A for measuring refractive index of particles", the refractive index Nav' of the coating film was measured with a spectroscopic ellipsometer, resulting in 1.518, 1.537, 1.556, 1.574, 1.596 and 1.602 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000171. The refractive index of the particles that gave this minimum value was 1.81. Based on these results, the refractive index of the core-shell type composite oxide fine particles was considered to be 1.81. The refractive index of the core-shell type composite oxide fine particles that was determined by the refractive index measurement method B (the standard liquid method) was 1.81.

Preparation of Methanol Dispersion Liquid (CSZ-4-M) of Core-Shell Type Composite Oxide Fine Particles The procedures in the preparation of the methanol dispersion liquid (CSZ-1-M) of core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (CSZ-4) of the core-shell type composite oxide fine particles (solid content: 30.0% by weight) prepared in this example. Thus, 1.12 kg of a methanol dispersion liquid (CSZ-4-M) of the core-shell type composite oxide fine particles was obtained which had a solid content of 30.0% by weight. The methanol dispersion liquid had a water content of about 0.3% by weight.

The methanol dispersion liquid had a pH value of 6.2 as measured after being diluted ten times, a haze of 6.3%, a viscosity of 2.4 mPa·s, and a viscosity as measured after the 7-day accelerated test at 40° C. of 2.4 mPa·s.

The core-shell type composite oxide fine particles had a negative charge per unit surface area of 1.46 μeq/m$^2$.

The methanol dispersion liquid of the core-shell type composite oxide fine particles was subjected to the photocatalytic activity test. The evaluation was good (○), with a discoloration rate of 1%. The acid stability test for the methanol dispersion liquid of the core-shell type composite oxide fine particles resulted in a transmittance change of 17%, thus the coverage rate being evaluated good (○).

Further, the methanol dispersion liquid (CSZ-4-M) of the core-shell type composite oxide fine particles was concentrated with a rotary evaporator to a solid concentration of 40% by weight. The viscosity of the concentrate was 3.6 mPa·s.

Preparation of Hardcoat Layer-Forming Coating Composition (H7)

A hardcoat layer-forming coating composition (H7) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 496.5 g of the methanol dispersion liquid (CSZ-4-M) of the core-shell type composite oxide fine particles.

Example 8

Preparation of Aqueous Dispersion Liquid (CSZ-5) of Core-Shell Type Composite Oxide Fine Particles The procedures in the preparation of the aqueous dispersion liquid (CSZ-1) of core-shell type composite oxide fine particles in Example 1 were repeated, except that the step (1) was performed in a manner such that the amounts of the silicic acid solution and the aqueous sodium aluminate solution which were mixed to the aqueous core particle dispersion liquid (CZ-1) prepared in Example were changed from 3.24 kg to 1.08 kg and from 2.42 kg to 0.81 kg, respectively. Thus, 1.13 kg of an aqueous dispersion liquid (CSZ-5) of core-shell type composite oxide fine particles was obtained which had a solid content of 30.0% by weight.

Here, the weight ratio in terms of oxides, namely, $SiO_2/Al_2O_3$ was 4.0 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 10.0 parts by weight with respect to 100 parts by weight of the core particle.

The contents of metal components in the core-shell type composite oxide fine particles contained in the aqueous dispersion liquid (CSZ-5) of the core-shell type composite oxide fine particles were measured. The results in terms of oxide of each metal element were 91.23% by weight of $ZrO_2$, 7.32% by weight of $SiO_2$, 1.14% by weight of $Al_2O_3$, 0.21% by weight of $Na_2O$ and 0.10% by weight of $K_2O$. These metal contents gave a specific gravity of the metal oxide fine particles of 5.01, and a $SiO_2/Al_2O_3$ weight ratio in the shell of 6.4.

The core-shell type composite oxide fine particles had an average particle diameter of 29 nm, a specific surface area of 180 $m^2/g$, and a negative charge of 0.62 µeq/$m^2$.

The aqueous dispersion liquid of the core-shell type composite oxide fine particles had a pH of 3.3, a haze of 2.3%, a viscosity of 7.9 mPa·s, and a viscosity as measured after the 7-day accelerated test at 40° C. of 8.0 mPa·s.

In accordance with the procedures described above in "Method A for measuring refractive index of particles", the refractive index Nav' of the coating film was measured with a spectroscopic ellipsometer, resulting in 1.523, 1.554, 1.576, 1.595, 1.626 and 1.633 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000570. The refractive index of the particles that gave this minimum value was 1.97. Based on these results, the refractive index of the core-shell type composite oxide fine particles was considered to be 1.97. The refractive index of the core-shell type composite oxide fine particles that was determined by the refractive index measurement method B (the standard liquid method) was 1.97.

Preparation of Methanol Dispersion Liquid (CSZ-5-M) of Core-Shell Type Composite Oxide Fine Particles The procedures in the preparation of the methanol dispersion liquid (CSZ-1-M) of core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (CSZ-5) of the core-shell type composite oxide fine particles (solid content: 30.0% by weight) prepared in this example. Thus, 0.83 kg of a methanol dispersion liquid (CSZ-5-M) of the core-shell type composite oxide fine particles was obtained which had a solid content of 30.0% by weight. The methanol dispersion liquid had a water content of about 0.3% by weight.

The methanol dispersion liquid had a pH value of 5.3 as measured after being diluted ten times, a haze of 7.1%, a viscosity of 2.8 mPa·s, and a viscosity as measured after the 7-day accelerated test at 40° C. of 2.9 mPa·s.

The core-shell type composite oxide fine particles had a negative charge per unit surface area of 0.62 µeq/$m^2$.

The methanol dispersion liquid of the core-shell type composite oxide fine particles was subjected to the photocatalytic activity test. The evaluation was good (○), with a discoloration rate of 1%. The acid stability test for the methanol dispersion liquid of the core-shell type composite oxide fine particles resulted in a transmittance change of 18%, thus the coverage rate being evaluated good (○).

Further, the methanol dispersion liquid (CSZ-5-M) of the core-shell type composite oxide fine particles was concentrated with a rotary evaporator to a solid concentration of 40% by weight. The viscosity of the concentrate was 54.0 mPa·s.

Preparation of Hardcoat Layer-Forming Coating Composition (H8)

A hardcoat layer-forming coating composition (H8) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 512.6 g of the methanol dispersion liquid (CSZ-5-M) of the core-shell type composite oxide fine particles prepared in this example.

Example 9

Preparation of Aqueous Dispersion Liquid (CSZ-6) of Core-Shell Type Composite Oxide Fine Particles The procedures in the preparation of the aqueous dispersion liquid (CSZ-1) of core-shell type composite oxide fine particles in Example 1 were repeated, except that the step (1) was performed in a manner such that the amounts of the silicic acid solution and the aqueous sodium aluminate solution which were mixed to the aqueous core particle dispersion liquid (CZ-1) prepared in Example 1 were changed from 3.24 kg to 14.60 kg and from 2.42 kg to 10.89 kg, respectively. Thus, 2.26 kg of an aqueous dispersion liquid (CSZ-6) of core-shell type composite oxide fine particles was obtained which had a solid content of 30.0% by weight.

Here, the weight ratio in terms of oxides, namely, $SiO_2/Al_2O_3$ was 4.0 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 60.0 parts by weight with respect to 100 parts by weight of the core particle.

The contents of metal components in the core-shell type composite oxide fine particles contained in the aqueous dispersion liquid (CSZ-6) of the core-shell type composite oxide fine particles were measured. The results in terms of oxide of each metal element were 48.93% by weight of $ZrO_2$, 43.70% by weight of $SiO_2$, 6.72% by weight of $Al_2O_3$, 0.54% by weight of $Na_2O$ and 0.11% by weight of $K_2O$. These metal contents gave a specific gravity of the metal oxide fine particles of 3.28, and a $SiO_2/Al_2O_3$ weight ratio in the shell of 6.5.

The core-shell type composite oxide fine particles had an average particle diameter of 32 nm, a specific surface area of 312 $m^2/g$, and a negative charge of 0.74 µeq/$m^2$.

The aqueous dispersion liquid (CSZ-6) of the core-shell type composite oxide fine particles had a pH of 4.1, a haze of 2.0%, a viscosity of 7.6 mPa·s, and a viscosity as measured after the 7-day accelerated test at 40° C. of 7.6 mPa·s.

In accordance with the procedures described above in "Method A for measuring refractive index of particles", the refractive index Nav' of the coating film was measured with a spectroscopic ellipsometer, resulting in 1.515, 1.538, 1.558, 1.566, 1.567 and 1.574 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000734. The refractive index of the particles that gave this minimum value was 1.70. Based on these results, the refractive index of the core-shell type composite oxide fine particles was considered to be 1.70. The refractive index of the core-shell type composite oxide fine particles that was determined by the refractive index measurement method B (the standard liquid method) was 1.70.

Preparation of Methanol Dispersion Liquid (CSZ-6-M) of Core-Shell Type Composite Oxide Fine Particles The procedures in the preparation of the methanol dispersion liquid (CSZ-1-M) of core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (CSZ-6) of the core-shell type composite oxide fine particles (solid content: 30.0% by weight) prepared in this example. Thus, 2.24 kg of a methanol dispersion liquid (CSZ-6-M) of the core-shell type composite oxide fine particles was obtained which had a solid content of 30.0% by weight. The methanol dispersion liquid had a water content of about 0.3% by weight.

The methanol dispersion liquid had a pH value of 6.2 as measured after being diluted ten times, a haze of 6.1%, a viscosity of 2.5 mPa·s, and a viscosity as measured after the 7-day accelerated test at 40° C. of 2.5 mPa·s.

The core-shell type composite oxide fine particles had a negative charge per unit surface area of 0.74 µeq/m².

The methanol dispersion liquid of the core-shell type composite oxide fine particles was subjected to the photocatalytic activity test. The evaluation was good (◯), with a discoloration rate of 1%. The acid stability test for the methanol dispersion liquid of the core-shell type composite oxide fine particles resulted in a transmittance change of 9%, thus the coverage rate being evaluated good (◯).

Further, the methanol dispersion sol (CSZ-6) of the core-shell type composite oxide fine particles was concentrated with a rotary evaporator to a solid concentration of 40% by weight. The viscosity of the concentrate was 4.1 mPa·s.

Preparation of Hardcoat Layer-Forming Coating Composition (H9)

A hardcoat layer-forming coating composition (H9) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 457.7 g of the methanol dispersion liquid (CSZ-6-M) of the core-shell type composite oxide fine particles prepared in this example.

Comparative Example 1

Preparation of Aqueous Dispersion Liquid (RCZ-1) of Core Particles

A cation exchange resin (DIAION SK1BH manufactured by Mitsubishi Chemical Corporation) was added to the aqueous core particle dispersion liquid (CZ-1) prepared in Example 1 so as to adjust the pH to 3.5. Without separating the resin, the dispersion liquid was aged for 7 hours while performing stirring and maintaining the temperature at 80° C. Thereafter, the cation exchange resin was removed, and the dispersion liquid was cooled to room temperature. The dispersion liquid was then concentrated using an ultrafiltration membrane. Thus, 1.07 kg of an aqueous core particle dispersion liquid (RCZ-1) was prepared which had a solid concentration of 30% by weight. The core particles were aggregated and deposited in a few minutes.

Comparative Example 2

Preparation of Aqueous Dispersion Liquid (RCSZ-2) of Core-Shell Type Composite Oxide Fine Particles The procedures in the preparation of the aqueous dispersion liquid (CSZ-1) of core-shell type composite oxide fine particles in Example 1 were repeated, except that the step (1) was performed in a manner such that the amounts of the silicic acid solution and the aqueous sodium aluminate solution which were mixed to the aqueous core particle dispersion liquid (CZ-1) prepared in Example 1 were changed from 3.24 kg to 3.96 kg and from 2.42 kg to 0.28 kg, respectively. Thus, 0.98 kg of an aqueous dispersion liquid (RCSZ-2) of core-shell type composite oxide fine particles was obtained which had a solid content of 30.0% by weight.

Here, the weight ratio in terms of oxides, namely, $SiO_2/Al_2O_3$ was 41.70 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 25.0 parts by weight with respect to 100 parts by weight of the core particle.

The contents of metal components in the core-shell type composite oxide fine particles contained in the aqueous dispersion liquid (RCSZ-2) of the core-shell type composite oxide fine particles were measured. The results in terms of oxide of each metal element were 74.66% by weight of $ZrO_2$, 24.59% by weight of $SiO_2$, 0.23% by weight of $Al_2O_3$, 0.41% by weight of $Na_2O$ and 0.11% by weight of $K_2O$. These metal contents gave a specific gravity of the metal oxide fine particles of 4.05, and a $SiO_2/Al_2O_3$ weight ratio in the shell of 107.4.

The core-shell type composite oxide fine particles had an average particle diameter of 82 nm, a specific surface area of 164 m²/g, and a negative charge of 0.41 µeq/m².

The aqueous dispersion liquid (RCSZ-2) of the core-shell type composite oxide fine particles had a pH of 3.9, a haze of 18.0% and a viscosity of 25.1 mPa·s. The 7-day accelerated test at 40° C. resulted in the gelation of the aqueous dispersion liquid.

In accordance with the procedures described above in "Method A for measuring refractive index of particles", the refractive index Nav' of the coating film was measured with a spectroscopic ellipsometer, resulting in 1.517, 1.539, 1.554, 1.576, 1.597 and 1.605 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000132. The refractive index of the particles that gave this minimum value was 1.80.

Based on these results, the refractive index of the core-shell type composite oxide fine particles was considered to be 1.80. The refractive index of the core-shell type composite oxide fine particles that was determined by the refractive index measurement method B (the standard liquid method) was 1.80.

Preparation of Methanol Dispersion Liquid (RCSZ-2-M) of Core-Shell Type Composite Oxide Fine Particles The procedures in the preparation of the organic solvent dispersion sol (CSZ-1) of zirconia-based core particles in Example 1 were repeated, except that the aqueous dispersion sol (CSZ-1) of the zirconia-based core-shell type composite oxide fine particles (solid content: 30.0% by weight) was replaced by the aqueous dispersion sol (RCSZ-2) of the zirconia-based core-shell type composite oxide fine particles (solid content: 30.0% by weight). Thus, 0.97 kg of a methanol dispersion liquid (RCSZ-2-M) of the core-shell type composite oxide fine particles was obtained which had a solid content of 30.0% by weight. The methanol dispersion liquid had a water content of about 0.3% by weight.

The methanol dispersion liquid had a pH value of 6.0 as measured after being diluted ten times, a haze of 26.5%, a viscosity of 34 mPa·s, and a viscosity as measured after the 7-day accelerated test at 40° C. of 75 mPa·s.

The core-shell type composite oxide fine particles had a negative charge per unit surface area of 0.41 μeq/m².

The methanol dispersion liquid of the core-shell type composite oxide fine particles was subjected to the photocatalytic activity test. The evaluation was good (○), with a discoloration rate of 1%. The acid stability test for the methanol dispersion liquid of the core-shell type composite oxide fine particles resulted in a transmittance change of 38%, thus the coverage rate being evaluated fair (Δ).

Further, an attempt was made to concentrate the methanol dispersion liquid (RCSZ-2-M) of the core-shell type composite oxide fine particles to a solid concentration of 40% by weight with a rotary evaporator, resulting in gelation.

Preparation of Hardcoat Layer-Forming Coating Composition (C1)

A hardcoat layer-forming coating composition (C1) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 470.9 g of the methanol dispersion liquid (RCSZ-2-M) of the core-shell type composite oxide fine particles with a solid concentration of 30% by weight prepared in this comparative example.

Comparative Example 3

Preparation of Aqueous Dispersion Liquid (RCSZ-3) of Core-Shell Type Composite Oxide Fine Particles The procedures in the preparation of the aqueous dispersion liquid (CSZ-1) of core-shell type composite oxide fine particles in Example 1 were repeated, except that the step (1) was performed in a manner such that the amounts of the silicic acid solution and the aqueous sodium aluminate solution which were mixed to the aqueous core particle dispersion liquid (CZ-1) prepared in Example 1 were changed from 3.24 kg to 1.80 kg and from 2.42 kg to 6.73 kg, respectively. Thus, 1.24 kg of an aqueous dispersion liquid (RCSZ-3) of core-shell type composite oxide fine particles was obtained which had a solid content of 30.0% by weight.

Here, the weight ratio in terms of oxides, namely, $SiO_2$/$Al_2O_3$ was 0.80 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 25.0 parts by weight with respect to 100 parts by weight of the core particle.

The contents of metal components in the core-shell type composite oxide fine particles contained in the aqueous dispersion liquid (RCSZ-3) of the core-shell type composite oxide fine particles were measured. The results in terms of oxide of each metal element were 74.21% by weight of $ZrO_2$, 15.49% by weight of $SiO_2$, 9.29% by weight of $Al_2O_3$, 0.87% by weight of $Na_2O$ and 0.14% by weight of $K_2O$. These metal contents gave a specific gravity of the metal oxide fine particles of 4.37, and a $SiO_2$/$Al_2O_3$ weight ratio in the shell of 1.7.

The core-shell type composite oxide fine particles had an average particle diameter of 54 nm, a specific surface area of 198 m²/g, and a negative charge of 0.27 μeq/m².

The aqueous dispersion liquid (RCSZ-3) of the core-shell type composite oxide fine particles had a pH of 4.2, a haze of 24.1% and a viscosity of 37.4 mPa·s. The 7-day accelerated test at 40° C. resulted in the gelation of the aqueous dispersion liquid. In accordance with the procedures described above in "Method A for measuring refractive index of particles", the refractive index Nav' of the coating film was measured with a spectroscopic ellipsometer, resulting in 1.510, 1.529, 1.544, 1.566, 1.592 and 1.597 when the weight fraction m of the particles contained in the coating composition was 10% by weight, 20% by weight, 30% by weight, 40% by weight, 50% by weight and 55% by weight, respectively. Based on the coating film refractive indexes Nav' and the coating film refractive indexes Nav calculated from the aforementioned volume fraction-weight fraction conversion equation and the Maxwell-Garnett equation, the minimum sum of squared deviations was determined to be 0.000041. The refractive index of the particles that gave this minimum value was 1.79. Based on these results, the refractive index of the core-shell type composite oxide fine particles was considered to be 1.79. The refractive index of the core-shell type composite oxide fine particles that was determined by the refractive index measurement method B (the standard liquid method) was 1.79.

Preparation of Methanol Dispersion Liquid (RCSZ-3-M) of Core-Shell Type Composite Oxide Fine Particles The procedures in the preparation of the methanol dispersion liquid (CSZ-1-M) of the core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (RCSZ-3) of the core-shell type composite oxide fine particles (solid content: 30.0% by weight) prepared in this example. Thus, 1.23 kg of a methanol dispersion liquid (RCSZ-3-M) of the core-shell type composite oxide fine particles was obtained which had a solid content of 30.0% by weight. The methanol dispersion liquid had a water content of about 0.3% by weight.

The methanol dispersion liquid (RCSZ-3-M) had a pH value of 5.8 as measured after being diluted ten times, a haze of 54.2% and a viscosity of 84 mPa·s. The 7-day accelerated test at 40° C. resulted in the gelation of the methanol dispersion liquid.

The core-shell type composite oxide fine particles had a negative charge per unit surface area of 1.77 μeq/m².

The methanol dispersion liquid of the core-shell type composite oxide fine particles was subjected to the photocatalytic activity test. The evaluation was good (○), with a discoloration rate of 1%. The acid stability test for the methanol dispersion liquid of the core-shell type composite oxide fine particles resulted in a transmittance change of 62%, thus the coverage rate being evaluated bad (x).

Further, an attempt was made to concentrate the methanol dispersion liquid (RCSZ-3-M) to a solid concentration of 40% by weight with a rotary evaporator, resulting in gelation.

Preparation of Hardcoat Layer-Forming Coating Composition (C2)

A hardcoat layer-forming coating composition (C2) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 508.1 g of the methanol dispersion liquid (RCSZ-3-M) of the core-shell type composite oxide fine particles prepared in this comparative example.

Comparative Example 4

Preparation of Aqueous Dispersion Liquid (RCST-1) of Core-Shell Type Composite Oxide Fine Particles The procedures in the preparation of the aqueous dispersion liquid (CST-2) of core-shell type composite oxide fine particles in Example 4 were repeated, except that the step (1) was performed in a manner such that the amounts of the silicic acid solution and the aqueous sodium aluminate solution which were mixed to the aqueous core particle dispersion liquid (CT-2) prepared in Example 4 were changed from 3.24 kg to 3.10 kg and from 2.42 kg to 0.22 kg, respectively. Thus, 0.77 kg of an aqueous dispersion liquid (RCST-1) of core-shell type composite oxide fine particles was obtained which had a solid content of 30.0% by weight.

Here, the weight ratio in terms of oxides, namely, $SiO_2/Al_2O_3$ was 41.70 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 25.0 parts by weight with respect to 100 parts by weight of the core particle.

The contents of metal components in the core-shell type composite oxide fine particles contained in the aqueous dispersion liquid (RCST-1) of the core-shell type composite oxide fine particles were measured. The results in terms of oxide of each metal element were 66.38% by weight of $TiO_2$, 8.30% by weight of $SnO_2$, 24.57% by weight of $SiO_2$, 0.23% by weight of $Al_2O_3$, 0.40% by weight of $Na_2O$ and 0.12% by weight of $K_2O$. These metal contents gave a specific gravity of the metal oxide fine particles of 3.55, and a $SiO_2/Al_2O_3$ weight ratio in the shell of 106.8.

The core-shell type composite oxide fine particles had an average particle diameter of 54 nm, a specific surface area of 198 $m^2/g$, and a negative charge of 0.27 $\mu eq/m^2$.

The aqueous dispersion liquid (RCST-1) of the core-shell type composite oxide fine particles had a pH of 3.5, a haze of 33.4% and a viscosity of 41.2 mPa·s. The 7-day accelerated test at 40° C. resulted in the gelation of the aqueous dispersion liquid.

Blushing occurred in all the coating films which were obtained from the coating compositions having a weight fraction m of the particles of 10% by weight, 20% by weight, 30% by weight, 40% by weight, 50% by weight and 55% by weight. Thus, the measurement of the refractive index Nav' in accordance with the procedures described above in "Method A for measuring refractive index of particles" was canceled.

Preparation of Methanol Dispersion Liquid (RCST-1-M) of Core-Shell Type Composite Oxide Fine Particles The procedures in the preparation of the methanol dispersion liquid (CSZ-1-M) of the core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (RCST-1) of the core-shell type composite oxide fine particles (solid content: 30.0% by weight) prepared in this example. Thus, 0.76 kg of a methanol dispersion liquid (RCST-1-M) of the core-shell type composite oxide fine particles was obtained which had a solid content of 30.0% by weight. The methanol dispersion liquid had a water content of about 0.3% by weight.

The methanol dispersion liquid had a pH value of 5.8 as measured after being diluted ten times, a haze of 54.2% and a viscosity of 84 mPa·s. The 7-day accelerated test at 40° C. resulted in the gelation of the methanol dispersion liquid.

The core-shell type composite oxide fine particles had a negative charge per unit surface area of 0.27 $\mu eq/m^2$.

The methanol dispersion liquid of the core-shell type composite oxide fine particles was subjected to the photocatalytic activity test. The evaluation was fair (Δ), with a discoloration rate of 48%. The acid stability test for the methanol dispersion liquid of the core-shell type composite oxide fine particles resulted in a transmittance change of 43%, thus the coverage rate being evaluated bad (x).

Further, an attempt was made to concentrate the methanol dispersion liquid (RCST-1-M) of the core-shell type composite oxide fine particles to a solid concentration of 40% by weight with a rotary evaporator, resulting in gelation.

Preparation of Hardcoat Layer-Forming Coating Composition (C3)

A hardcoat layer-forming coating composition (C3) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 412.8 g of the methanol dispersion liquid (RCST-1-M) of the core-shell type composite oxide fine particles prepared in this comparative example.

Preparation of Hardcoat Layer-Forming Coating Composition (C6)

A hardcoat layer-forming coating composition (C6) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 495.3 g of the methanol dispersion liquid (RCST-1-M) of the core-shell type composite oxide fine particles prepared in this comparative example.

Preparation of Primer Layer-Forming Coating Composition (CX-1)

A primer layer-forming coating composition (CX-1) was prepared in the same manner as the preparation of the primer layer-forming coating composition (P1) in Example 4, except that 227.3 g of the methanol dispersion liquid (CST-2-M) of the core-shell type composite oxide fine particles was replaced by 227.3 g of the methanol dispersion liquid (RCST-1-M) of the core-shell type composite oxide fine particles.

Comparative Example 5

Preparation of Aqueous Dispersion Liquid (RCZ-1) of Core Particles

The procedures in the preparation of the aqueous core particle dispersion liquid (CZ-1) in Example 1 were repeated, except that the precursor slurry of the zirconia-based composite oxide fine particles was hydrothermally treated in the autoclave at 950° C. for 11 hours instead of 150° C. for 11 hours, and that the aqueous dispersion liquid of the zirconia-based composite oxide fine particles was spray dried and the dried powder was used without being calcined. Thus, 2.46 kg of an aqueous core particle dispersion liquid (RCZ-1) was obtained which had a concentration of 10% by weight in terms of $ZrO_2$. The core particles (RCZ-1) had an average particle diameter of 4 nm and a specific surface area of 273 $m^2/g$.

The contents of metal components in the core particles in terms of oxide of each metal component were 97.70% by weight of $ZrO_2$ and 2.30% by weight of $K_2O$.

Preparation of Aqueous Dispersion Liquid (RCSZ-4) of Core-Shell Type Composite Oxide Fine Particles The procedures in the preparation of the aqueous dispersion liquid (CSZ-1) of core-shell type composite oxide fine particles in Example 1 were repeated, except that the aqueous core particle dispersion liquid (CZ-1) (solid content: 10.0% by weight) was replaced by the aqueous core particle dispersion liquid (RCZ-1) (solid content: 10.0% by weight) prepared in this comparative example. Thus, 1.08 kg of an aqueous dispersion liquid (RCSZ-4) of core-shell type composite oxide fine particles was obtained which had a solid content of 30.0% by weight. However, the aqueous dispersion liquid (RCSZ-4) was gelled in a few minutes.

In this step, the weight ratio in terms of oxides, namely, $SiO_2/Al_2O_3$ was 4.0 wherein $SiO_2$ indicates the silicon components contained in the silicic acid solution used in the production of shell and $Al_2O_3$ indicates the aluminum components contained in the aqueousسودium aluminate solution used in the production of shell. The amount of the shell covering the core particle was 25.0 parts by weight with respect to 100 parts by weight of the core particle.

Comparative Example 6

Preparation of Aqueous Dispersion Liquid (RCZ-2) of Core Particles

The procedures in the preparation of the aqueous core particle dispersion liquid (CZ-1) in Example 1 were repeated, except that the dried powder of the zirconia-based composite oxide fine particles was calcined at 700° C. for 2 hours instead of 500° C. for 2 hours. Thus, 2.36 kg of an aqueous core particle dispersion liquid (RCZ-2) was obtained which had a concentration of 10% by weight in terms of $ZrO_2$. The core particles contained in the aqueous core particle dispersion liquid (RCZ-2) had an average particle diameter of 89 nm and a specific surface area of 21 $m^2/g$.

The contents of metal components in the core particles in terms of oxide of each metal component were 98.90% by weight of $ZrO_2$ and 1.10% by weight of $K_2O$.

Preparation of Aqueous Dispersion Liquid (RCSZ-5) of Core-Shell Type Composite Oxide Fine Particles The procedures in the preparation of the aqueous dispersion liquid (CSZ-1) of core-shell type composite oxide fine particles in Example 1 were repeated, except that the aqueous core particle dispersion liquid (CZ-1) (solid content: 10.0% by weight) was replaced by the aqueous core particle dispersion liquid (RCZ-5) (solid content: 10.0% by weight) prepared in this comparative example. Thus, 1.04 kg of an aqueous dispersion liquid (RCSZ-5) of core-shell type composite oxide fine particles was obtained which had a solid content of 30.0% by weight.

Here, the weight ratio in terms of oxides, namely, $SiO_2/Al_2O_3$ was 4.0 wherein $SiO_2$ indicates the silicon components contained in the silicic acid solution used in the production of shell and $Al_2O_3$ indicates the aluminum components contained in the aqueous sodium aluminate solution used in the production of shell. The amount of the shell covering the core particle was 25.0 parts by weight with respect to 100 parts by weight of the core particle.

The contents of metal components in the core-shell type composite oxide fine particles contained in the aqueous dispersion liquid (RCSZ-5) of the core-shell type composite oxide fine particles were measured. The results in terms of oxide of each metal element were 78.34% by weight of $ZrO_2$, 18.42% by weight of $SiO_2$, 2.78% by weight of $Al_2O_3$, 0.38% by weight of $Na_2O$ and 0.08% by weight of $K_2O$. These metal contents gave a specific gravity of the metal oxide fine particles of 4.32, and a $SiO_2/Al_2O_3$ weight ratio in the shell of 6.1.

The core-shell type composite oxide fine particles had an average particle diameter of 90 nm, a specific surface area of 133 $m^2/g$, and a negative charge of 0.75 µeq/$m^2$.

The aqueous dispersion liquid of the core-shell type composite oxide fine particles had a pH of 4.0, a haze of 21.3%, a viscosity of 6.8 mPa·s, and a viscosity after the 7-day accelerated test at 40° C. of 6.9 mPa·s.

Blushing occurred in all the coating films which were obtained from the coating compositions having a weight fraction m of the particles of 10% by weight, 20% by weight, 30% by weight, 40% by weight, 50% by weight and 55% by weight. Thus, the measurement of the refractive index Nav' in accordance with the procedures described above in "Method A for measuring refractive index of particles" was canceled.

Preparation of Methanol Dispersion Liquid (RCSZ-5-M) of Core-Shell Type Composite Oxide Fine Particles The procedures in the preparation of the methanol dispersion liquid (CSZ-1-M) of the core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (RCSZ-5) of the core-shell type composite oxide fine particles (solid content: 30.0% by weight) prepared in this comparative example. Thus, 1.03 kg of a methanol dispersion sol or a methanol dispersion liquid (RCSZ-5-M) of the core-shell type composite oxide fine particles was obtained which had a solid content of 30.0% by weight. The methanol dispersion liquid had a water content of about 0.3% by weight.

The methanol dispersion liquid had a pH value of 6.1 as measured after being diluted ten times, a haze of 24.8%, a viscosity of 2.0 mPa·s, and a viscosity after the 7-day accelerated test at 40° C. of 2.1 mPa·s.

The core-shell type composite oxide fine particles had a negative charge per unit surface area of 0.41 µeq/$m^2$.

The methanol dispersion liquid of the core-shell type composite oxide fine particles was subjected to the photocatalytic activity test. The evaluation was good (◯), with a discoloration rate of 1%. The acid stability test for the methanol dispersion liquid of the core-shell type composite oxide fine particles resulted in a transmittance change of 9%, thus the coverage rate being evaluated good (◯).

Further, the methanol dispersion liquid (RCSZ-5-M) of the core-shell type composite oxide fine particles was concentrated with a rotary evaporator to a solid concentration of 40% by weight. The viscosity of the concentrate was 3.5 mPa·s.
Preparation of Hardcoat Layer-Forming Coating Composition (C4)

A hardcoat layer-forming coating composition (C4) was prepared in the same manner as the preparation of the hardcoat layer-forming coating composition (H1) in Example 1, except that 502.3 g of the methanol dispersion liquid (CSZ-1-M) of the core-shell type composite oxide fine particles was replaced by 361.7 g of the methanol dispersion liquid (RCSZ-5-M) of the core-shell type composite oxide fine particles prepared in this comparative example.

Comparative Example 7

Preparation of Aqueous Dispersion Liquid (RCST-2) of Core-Shell Type Composite Oxide Fine Particles Step (1)

7.48 kg of ion exchange water was added to 1.87 kg of the aqueous core particle dispersion liquid (CT-1) (solid content: 10.0% by weight) prepared in Example 3. While performing stirring, the mixture was heated to 90° C. To the mixture, 2.49 kg of the silicic acid solution prepared in Example 1 which had a concentration in terms of $SiO_2$ of 2.0% by weight was gradually admixed over a period of 3 hours. To the resultant mixture, 1.86 kg of an aqueous sodium aluminate solution with a concentration of 0.67% by weight in terms of $Al_2O_3$ was gradually admixed over a period of 1 hour. Here, the weight ratio in terms of oxides, namely, $SiO_2/Al_2O_3$ was 4.0 wherein $SiO_2$ indicates the silicon components contained in the silicic acid solution and $Al_2O_3$ indicates the aluminum components contained in the aqueous sodium aluminate solution. The amount of the shell covering the core particle was 25 parts by weight with respect to 100 parts by weight of the core particle.
Step (2)

The mixture liquid prepared in the above step was stirred for 1 hour while maintaining the temperature at 90° C. Thus, an aqueous dispersion liquid was obtained which contained core-shell type fine particles in which the titanium-based core particles had been covered with the silicon oxide and the aluminum oxide.
Step (3)

The aqueous dispersion liquid of the core-shell type fine particles that was obtained in the above step was mixed together with 0.23 kg of a cation exchange resin (DIAION SK1BH manufactured by Mitsubishi Chemical Corporation) so as to adjust the pH to 3.5. Thereafter, without removing the resin, the dispersion liquid was aged for 7 hours while performing stirring and maintaining the temperature at 80° C. After that, the cation exchange resin was separated and removed with a stainless steel filter having an opening size of 44 μm. Thus, 13.70 kg of an aqueous dispersion liquid of the core-shell type fine particles that had a solid content of 1.8% by weight was obtained.

The aqueous dispersion liquid of the core-shell type fine particles was then cooled to room temperature and was concentrated using an ultrafiltration membrane (SIP-1013 manufactured by Asahi Kasei Corporation), thereby obtaining 0.82 kg of an aqueous dispersion liquid of the core-shell type fine particles that had a solid content of 30.0% by weight (hereinafter, referred to as "RCST-2").

The contents of metal elements in the core-shell type composite oxide fine particles contained in the aqueous dispersion liquid (RCST-2) of the core-shell type fine particles were measured. The results in terms of oxide of each metal element were 53.07% by weight of $TiO_2$, 35.65% by weight of $SiO_2$, 4.03% by weight of $Al_2O_3$, 0.49% by weight of $Na_2O$, and 0.13% by weight of $K_2O$. These metal element contents gave a specific gravity of the core-shell type composite oxide fine particles of 3.25, and a $SiO_2/Al_2O_3$ ratio of 6.9. The core-shell type composite oxide fine particles had an average particle diameter of 164 nm, a specific surface area of 268 m$^2$/g, and a negative charge per unit surface area of 0.19 μeq/m$^2$.

The aqueous dispersion liquid (RCST-2) of the core-shell type fine particles had a pH of 3.4, a haze of 72.0% and a viscosity of 53.0 mPa·s. The 7-day accelerated test at 40° C. resulted in the gelation of the aqueous dispersion liquid.

Blushing occurred in all the coating films which were obtained from the coating compositions having a weight fraction m of the particles of 10% by weight, 20% by weight, 30% by weight, 40% by weight, 50% by weight and 55% by weight. Thus, the measurement of the refractive index Nav' in accordance with the procedures described above in "Method A for measuring refractive index of particles" was canceled.

The refractive index of the core-shell type fine particles that was determined by the refractive index measurement method B (the standard liquid method) was 1.82.
Preparation of Methanol Dispersion Liquid (RCST-2-M) of Core-Shell Type Fine Particles The procedures in the preparation of the methanol dispersion liquid (CSZ-1-M) of the core-shell type composite oxide fine particles in Example 1 were repeated, except that the aqueous dispersion liquid (CSZ-1) of the core-shell type composite oxide fine particles (solid content: 30.0% by weight) was replaced by the aqueous dispersion liquid (RCST-2) of the core-shell type fine particles (solid content: 30.0% by weight) prepared in this comparative example. Thus, 0.81 kg of a methanol dispersion liquid (RCST-2-M) of the core-shell type fine particles was obtained which had a solid content of 30.0% by weight. The methanol dispersion liquid had a water content of about 0.3% by weight.

The methanol dispersion liquid (RCST-2-M) of the core-shell type fine particles had a pH value of 5.3 as measured after being diluted ten times, a haze of 76.2% and a viscosity of 37.4 mPa·s. The 7-day accelerated test at 40° C. resulted in the gelation of the dispersion liquid.

The core-shell type fine particles had a negative charge per unit surface area of 0.19 μeq/m$^2$.

The methanol dispersion liquid of the core-shell type fine particles was subjected to the photocatalytic activity test. The evaluation was bad (x), with a discoloration rate of 78%. The acid stability test for the methanol dispersion liquid of the core-shell type fine particles resulted in a transmittance change of 48%, thus the coverage rate being evaluated bad (x).

Further, an attempt was made to concentrate the methanol dispersion liquid (RCST-2-M) of the core-shell type composite oxide fine particles to a solid concentration of 40% by weight with a rotary evaporator, resulting in gelation.
Preparation of Hardcoat Layer-Forming Coating Composition (C5)

A hardcoat layer-forming coating composition (C5) was prepared in the same manner as the preparation of the hardcoat layer-forming coating composition (H1) in Example 1, except that 502.3 g of the methanol dispersion liquid (CSZ- 1-M) of the core-shell type composite oxide fine particles was replaced by 361.7 g of the methanol dispersion liquid (RCST-2-M) of the core-shell type fine particles prepared in this comparative example.

Comparative Example 8

Preparation of Aqueous Dispersion Liquid (RCST-3) of Core-Shell Type Composite Oxide Fine Particles An attempt was made to prepare an aqueous dispersion liquid of core-shell type composite oxide fine particles in the same manner as the production of the aqueous dispersion liquid (CST-1) of the core-shell type composite oxide fine particles in Example 3, except that the step (1) was performed in a manner such that 3.24 kg of the silicic acid solution which was added to the aqueous core particle dispersion liquid (CT-1) prepared in Example 3 was replaced by 3.24 kg of a water glass solution having a concentration of 2.0% by weight in terms of $SiO_2$. However, the aqueous dispersion liquid resulting from the step (2) was white turbid and contained aggregated precipitates. Thus, the step (3) was cancelled. The preparation of a methanol dispersion liquid and a coating composition was also cancelled.

The aqueous dispersion liquid had a pH of 12.2, which was within a pH region causing destabilization of the core particles. The $SiO_2/Al_2O_3$ weight ratio in the shell was 4.0. The amount of the shell covering the core particle was 25.0 parts by weight with respect to 100 parts by weight of the core particle.

Table 1 describes the evaluation results of the properties of the methanol dispersion liquids of the core-shell type composite oxide fine particles (30% by weight concentration) prepared in Examples 1 to 9 and Comparative Examples 2 to 4, 6 and 7, namely, the pH, the haze, the negative charge per unit surface area of the particles, the viscosities (at 30% by weight concentration, after the accelerated test, and at 40% by weight concentration), the acid stability, the photocatalytic activity and the refractive indexes of the particles (measured with respect to the aqueous dispersion liquids).

The results show that the methanol dispersion liquids of the core-shell type composite oxide fine particles prepared in Examples were stable even in an acidic pH region and were not gelled even at a high concentration in such a pH region, as well as that these methanol dispersion liquids had high transparency. Further, the methanol dispersion liquids in Examples exhibited high acid stability, namely, had a high rate of the coverage of the core with the shell. Furthermore, the methanol dispersion liquids of the core-shell type composite oxide fine particles in Examples proved high weather resistance.

Example 10

Preparation of Plastic Lens Substrate Samples (Test Pieces)

(1) Pretreatment of Plastic Lens Substrates

Commercial plastic lens substrates "CR-39" (using a monomer manufactured by PPG, refractive index of substrate: 1.50), "monomer name: MR-8" (manufactured by Mitsui Chemicals, Inc., refractive index of substrate: 1.60) and "monomer name: MR-174" (manufactured by Mitsui Chemicals, Inc., refractive index of substrate: 1.74) were etched by being soaked in an aqueous KOH solution having a concentration of 10% by weight that had been maintained at 40° C. for 2 minutes. Further, the substrates were collected, washed with water and sufficiently dried.

(2) Formation of Primer Layers

The pretreated plastic lens substrates were each coated with the primer layer-forming coating composition, thereby forming a wet film. The coating composition was applied by a dipping method (pick up rate: 120 mm/min).

Subsequently, the wet film was heat treated at 100° C. for 10 minutes to preliminarily dry the film (the primer layer).

The primer layers formed by the preliminary curing as described above generally had a thickness of 0.5 to 0.7 μm.

(3) Formation of Hardcoat Layers

The hardcoat layer-forming coating compositions were each applied to the surface of the pretreated plastic lens substrate or the primer-coated plastic lens substrate to form a wet film. The coating composition was applied by a dipping method (pick up rate: 250 mm/min).

Subsequently, the wet film was dried at 90° C. for 10 minutes and was heat treated at 110° C. for 2 hours, thereby curing the coating layer (the hardcoat layer). At this time, the primer layer was simultaneously cured.

The hardcoat layers that were cured according to the above procedure had a thickness of around 3.0 to 3.5 μm.

(4) Formation of Antireflective Layers

The inorganic oxide components described below were deposited by a vacuum deposition method onto the surface of the hardcoat layer. In this manner, an antireflective layer was formed in which $SiO_2$: 0.06λ, $ZrO_2$: 0.15λ, $SiO_2$: 0.04λ, $ZrO_2$: 0.25λ, and $SiO_2$: 0.25λ were stacked on top of one another in this order from the hardcoat layer side toward the atmosphere side. The design wavelength λ was 520 nm.

Evaluation Test of Film Hardness

The hardcoat layer-forming coating compositions H1, H2, H3, H4, H5, H6, H7, H8, H9, C1, C2, C3, C5 and C6 prepared in Examples 1 to 9 and Comparative Examples 2 to 4, 6 and 7 were each applied onto the pretreated plastic lens substrate CR-39 to form a hardcoat layer. The substrates with the hardcoat layer were tested in accordance with the aforementioned method to measure the film hardness. The results are described in Table 2.

The results in Table 2 show that the substrates which had the hardcoat layer formed by applying the coating composition from inventive Example exhibited high film hardness.

Evaluation of Appearance, Scratch Resistance, Adhesion and Weather Resistance

According to the combinations shown in Table 3, the hardcoat layer-forming coating compositions H1, H2, H3, H4, H5, H6, H7, H8, H9, H10, C1, C2, C3, C4, C5 and C6 and the primer layer-forming coating compositions P1 and CX-1 prepared in Examples 1 to 9 and Comparative Examples 2 to 4, 6 and 7, were applied onto the pretreated plastic lens substrates to form primer layers and hardcoat layers. Further, an antireflective layer was formed on the surface of each substrate having the above layers. Thus, test pieces 1 to 16 were fabricated.

"Monomer name: MR-174" (manufactured by Mitsui Chemicals, Inc., refractive index of substrate: 1.74) was used as the substrate for test piece 10 on which the primer layer-forming coating composition P1 and the hardcoat layer-forming coating composition H10 were applied and an antireflective layer was formed thereon, as well as the substrate for test piece 16 on which the primer layer-forming coating composition CX-1 and the hardcoat layer-forming coating composition C6 were applied and an antireflective layer was formed thereon. "Monomer name: MR-8" (manufactured by Mitsui Chemicals, Inc., refractive index of substrate: 1.60) was used as the substrate for each of other test pieces.

The test pieces 1 to 16 were tested in accordance with the aforementioned evaluation methods to test and evaluate the appearance (interference fringes), the appearance (cloudiness), the scratch resistance, the adhesion and the weather resistance. The results are described in Table 3.

The results show that the test pieces obtained by applying the coating compositions from Examples achieved high scratch resistance as well as high transparency without cloudiness. Further, these test pieces exhibited high adhesion and high weather resistance.

TABLE 1

|  | pH | Haze (%) | Negative charge (μeq/m²) | Viscosity 30 wt % | Viscosity 30 wt % and after accelerated test | Viscosity 40 wt % | Refractive index | Acid stability | Photocatalytic activity |
|---|---|---|---|---|---|---|---|---|---|
| Ex. 1 | 5.9 | 6.5 | 0.82 | 2.0 | 2.0 | 3.4 | 1.81 | ○ | ○ |
| Ex. 2 | 6.0 | 3.1 | 0.75 | 2.1 | 2.1 | 5.9 | 1.79 | ○ | ○ |
| Ex. 3 | 5.2 | 9.1 | 0.57 | 2.4 | 2.4 | 3.8 | 1.83 | ○ | ○ |
| Ex. 4 | 5.9 | 10.4 | 0.70 | 1.9 | 1.9 | 3.0 | 2.37 | ○ | ○ |
| Ex. 5 | 5.8 | 2.7 | 0.92 | 2.8 | 2.9 | 8.2 | 1.68 | ○ | ○ |
| Ex. 6 | 5.6 | 6.8 | 0.66 | 2.3 | 2.4 | 37.6 | 1.81 | ○ | ○ |
| Ex. 7 | 6.2 | 6.3 | 1.46 | 2.4 | 2.4 | 3.6 | 1.81 | ○ | ○ |
| Ex. 8 | 5.3 | 7.1 | 0.62 | 2.8 | 2.9 | 54.0 | 1.97 | ○ | ○ |
| Ex. 9 | 6.2 | 6.1 | 0.74 | 2.5 | 2.5 | 4.1 | 1.70 | ○ | ○ |
| Comp. Ex. 1 | — | — | — | — | — | — | — | — | — |
| Comp. Ex. 2 | 6.0 | 26.5 | 0.41 | 34 | 75 | gelation | 1.80 | Δ | ○ |
| Comp. Ex. 3 | 6.3 | 46.8 | 1.77 | 52 | 120 | gelation | 1.79 | x | ○ |
| Comp. Ex. 4 | 5.8 | 54.2 | 0.27 | 84 | gelation | gelation | blushing | x | Δ |
| Comp. Ex. 5 | — | — | — | — | — | — | — | — | — |
| Comp. Ex. 6 | 6.1 | 24.8 | 0.41 | 2.0 | 2.1 | 3.5 | blushing | ○ | ○ |
| Comp. Ex. 7 | 5.3 | 76.2 | 0.19 | 37.4 | gelation | gelation | 1.82 | x | x |
| Comp. Ex. 8 | — | white turbid | — | — | — | — | — | — | — |

TABLE 2

| Hardcoat layer-forming coating composition | Film hardness |
|---|---|
| H1 | 3.0 |
| H2 | 2.6 |
| H3 | 2.3 |
| H4 | 2.1 |
| H5 | 2.5 |
| H6 | 2.8 |
| H7 | 3.2 |
| H8 | 2.2 |
| H9 | 3.1 |
| C1 | 1.2 |
| C2 | 1.0 |
| C3 | 1.7 |
| C4 | 1.9 |
| C5 | 1.1 |

TABLE 3

| Test piece No. (substrate) | Hardcoat coating composition | Primer coating composition | Appearance (cloudiness) | Appearance (interference fringes) | Scratch resistance | Adhesion | Weather resistance (appearance) | Weather resistance (adhesion) |
|---|---|---|---|---|---|---|---|---|
| 1 (MR-8) | H1 | None | A | S | A | Good | Good | Good |
| 2 (MR-8) | H2 | None | A | S | A | Good | Good | Good |
| 3 (MR-8) | H3 | None | A | S | A | Good | Good | Good |
| 4 (MR-8) | H4 | None | A | A | B | Good | Good | Good |
| 5 (MR-8) | H5 | None | A | B | A | Good | Good | Good |
| 6 (MR-8) | H6 | None | A | A | A | Good | Good | Good |
| 7 (MR-8) | H7 | None | A | A | A | Good | Good | Good |
| 8 (MR-8) | H8 | None | A | A | A | Good | Good | Good |
| 9 (MR-8) | H9 | None | A | B | A | Good | Good | Good |
| 10 (MR-174) | H10 | P1 | — | — | A | Good | Good | Good |
| 11 (MR-8) | C1 | None | B | B | C | Good | Good | Good |
| 12 (MR-8) | C2 | None | B | B | D | Good | Good | Good |
| 13 (MR-8) | C3 | None | D | — | C | Good | Bad | Good |
| 14 (MR-8) | C4 | None | C | B | C | Good | Good | Good |
| 15 (MR-8) | C5 | None | D | — | D | Good | Bad | Bad |
| 16 (MR-174) | C6 | CX-1 | — | — | C | Good | Bad | Bad |

The invention claimed is:

1. A dispersion liquid of core-shell type composite oxide fine particles comprising core-shell type composite oxide fine particles which comprises a core particle and shell and in which the surface of the core particle is covered with the shell, the core particle comprises an oxide fine particle or a composite oxide fine particle that does not contain silicon and/or aluminum as main component, and the shell comprises a composite oxide containing silicon and aluminum as main components and the shell comprises the silicon and aluminum in a weight ratio in terms of oxides, $SiO_2/Al_2O_3$, in the range of 6.4 to 30.0, wherein the core-shell type composite oxide fine particles have a surface negative charge per unit surface area in the range of 0.5 to 1.5 $\mu eq/m^2$ as measured at pH 6.

2. The dispersion liquid of core-shell type composite oxide fine particles according to claim 1, wherein the shell comprises a silicon aluminum composite oxide.

3. The dispersion liquid of core-shell type composite oxide fine particles according to claim 1, wherein the shell contains silicon and aluminum in a weight ratio in terms of oxides, $SiO_2/Al_2O_3$, in the range of 6.4 to 15.0.

4. The dispersion liquid of core-shell type composite oxide fine particles according to claim 1, wherein the amount of the shell covering the core particle is in the range of 5 to 100 parts by weight with respect to 100 parts by weight of the core particle.

5. The dispersion liquid of core-shell type composite oxide fine particles according to claim 1, wherein the core-shell type composite oxide fine particles have an average particle diameter in the range of 8 to 60 nm.

6. The dispersion liquid of core-shell type composite oxide fine particles according to claim 1, wherein the core particles are oxide fine particles or composite oxide fine particles that contain one or more elements selected from zirconium, tin, titanium, niobium, tungsten, antimony and indium as main components.

7. The dispersion liquid of core-shell type composite oxide fine particles according to claim 1, wherein the core particles are oxide fine particles or composite oxide fine particles that contain one or more elements selected from titanium, tin, silicon, zirconium, antimony, barium, strontium, lithium, indium, lanthanum, potassium and sodium as auxiliary components.

8. The dispersion liquid of core-shell type composite oxide fine particles according to claim 1, wherein the solid concentration is in the range of 5 to 60% by weight.

9. The dispersion liquid of core-shell type composite oxide fine particles according to claim 1, wherein the viscosity at a solid concentration of 30% by weight is in the range of 0.8 to 20 mPa·s.

10. The dispersion liquid of core-shell type composite oxide fine particles according to claim 1, wherein the dispersion medium is water and/or one, or two or more selected from alcohols including methanol, ethanol, butanol, propanol and isopropyl alcohol, ethers including ethylene glycol monomethyl ether, propylene glycol monomethyl ether and propylene glycol monoethyl ether, and ketones including methyl ethyl ketone and γ-butyrolactone.

11. The dispersion liquid of core-shell type composite oxide fine particles according to claim 1, wherein the surface of the core-shell type composite oxide fine particles has been modified with an organosilicon compound or an amine.

12. The dispersion liquid of core-shell type composite oxide fine particles according to claim 1, wherein the pH is in the range of 3M to 7.0.

13. A coating composition comprising the dispersion liquid of core-shell type composite oxide fine particles described in claim 1, and a binder component.

14. The coating composition according to claim 13, wherein the content of the core-shell type composite oxide fine particles is in the range of 0.1 to 50% by weight in terms of solid concentration.

15. The coating composition according to claim 13, wherein the viscosity is in the range of 1 to 100 mPa·s when the content of the core-shell type composite oxide fine particles is 30% by weight in terms of solid concentration.

16. The coating composition according to claim 13, further comprising a UV absorber.

17. A curable coating film which is obtained by applying the coating composition described in claim 13 onto a substrate.

18. A substrate having a coating film which is obtained by providing the curable coating film described in claim 17 on a substrate.

19. A process for producing the dispersion liquid of core-shell type composite oxide fine particles of claim 1, comprising:
(1) a step of mixing a silicon compound solution which contains a silicon alkoxide and/or silicic acid, and an aqueous aluminate solution to an aqueous dispersion liquid of core particles having an average particle diameter in the range of 5.0 to 50.0 nm, in a weight ratio in terms of oxides, $SiO_2/Al_2O_3$, in the range of 6.4 to 30.0 wherein $SiO_2$ indicates a silicon component contained in the silicon compound solution and $Al_2O_3$ indicates an aluminum component contained in the aqueous aluminate solution; and
(2) a step of heating the mixture liquid obtained in the above step to a temperature of 60 to 200° C. and stirring the mixture liquid at the temperature for 0.5 to 20 hours.

20. The process for producing a dispersion liquid of core-shell type composite oxide fine particles according to claim 19, further comprising:
(3) a step of contacting the mixture liquid obtained in the step (2) with a cation exchange resin to remove by ion exchange alkali metal ions contained in the mixture liquid and thereby controlling the pH of the mixture liquid to be in the range of 3.0 to 7.0.

21. The process for producing a dispersion liquid of core-shell type composite oxide fine particles according to claim 19, wherein the silicon compound solution and the aqueous aluminate solution are added to the aqueous dispersion liquid of core particles at the same time.

22. The process for producing core-shell type composite oxide fine particles according to claim 19, wherein the silicon compound solution is a silicic acid solution having a pH of not more than 3.

23. The process for producing a dispersion liquid of core-shell type composite oxide fine particles according to claim 19, wherein the core particles are oxide fine particles or composite oxide fine particles that contain one or more elements selected from zirconium, tin, titanium, niobium, tungsten, antimony and indium as main components.

24. The process for producing core-shell type composite oxide fine particles according to claim 19, wherein the core particles have a specific surface area in the range of 50 to 250 $m^2/g$.

25. The process for producing core-shell type composite oxide fine particles according to claim 19, wherein the core particles are particles that are obtained by spray drying or by spray drying followed by calcination of an aqueous dispersion liquid containing the core particles.

26. The process for producing a dispersion liquid of core-shell type composite oxide fine particles according to claim 19, further comprising surface treating the core-shell type composite oxide fine particles with an organosilicon compound or an amine.

27. The process for producing a dispersion liquid of core-shell type composite oxide fine particles according to claim 19, further comprising subjecting the dispersion liquid to a concentration step and/or an organic solvent replacement step.

* * * * *

UNITED STATES PATENT AND TRADEMARK OFFICE
CERTIFICATE OF CORRECTION

| | |
|---|---|
| PATENT NO. | : 9,234,106 B2 |
| APPLICATION NO. | : 13/389178 |
| DATED | : January 12, 2016 |
| INVENTOR(S) | : Yoichi Ishihara et al. |

Page 1 of 1

It is certified that error appears in the above-identified patent and that said Letters Patent is hereby corrected as shown below:

Claims

Column 58, Line 1, Claim 19, delete "the dispersion liquid of" and insert -- a dispersion liquid of --

Column 58, Line 32, Claim 22, after "process for producing" insert -- a dispersion liquid of --

Column 58, Line 42, Claim 24, after "process for producing" insert -- a dispersion liquid of --

Column 58, Line 46, Claim 25, after "process for producing" insert -- a dispersion liquid of --

Signed and Sealed this
Twenty-sixth Day of April, 2016

Michelle K. Lee
*Director of the United States Patent and Trademark Office*